United States Patent
Cho et al.

(10) Patent No.: US 9,781,570 B2
(45) Date of Patent: Oct. 3, 2017

(54) METHOD AND APPARATUS FOR ESTIMATING LOCATION OF ELECTRONIC DEVICE

(71) Applicant: Samsung Electronics Co., Ltd., Gyeonggi-do (KR)

(72) Inventors: Sung-Rae Cho, Gyeonggi-do (KR); Chae-Man Lim, Seoul (KR); Tae-Yoon Kim, Gyeonggi-do (KR); Dong-Ryeol Ryu, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 19 days.

(21) Appl. No.: 14/695,348

(22) Filed: Apr. 24, 2015

(65) Prior Publication Data

US 2015/0312719 A1    Oct. 29, 2015

(30) Foreign Application Priority Data

Apr. 24, 2014    (KR) ................. 10-2014-0049389

(51) Int. Cl.
    *H04W 4/02*     (2009.01)
    *H04W 64/00*    (2009.01)

(52) U.S. Cl.
    CPC .......... *H04W 4/027* (2013.01); *H04W 64/003* (2013.01)

(58) Field of Classification Search
    CPC ... G01S 5/0294; G01S 5/0009; G06Q 10/063; G06Q 50/30; H04W 4/027; H04W 64/003; H04W 64/00; H04W 4/02; H04W 4/006; H04L 67/12
    See application file for complete search history.

(56) References Cited

U.S. PATENT DOCUMENTS

| 5,051,751 | A  | 9/1991  | Gray |
| 7,551,579 | B2 | 6/2009  | Alizadeh-Shabdiz et al. |
| 7,663,540 | B2 | 2/2010  | Oda et al. |
| 8,339,316 | B1 | 12/2012 | Mendis |
| 8,442,554 | B2 | 5/2013  | Keshav et al. |
| 8,510,041 | B1 | 8/2013  | Anguelov et al. |
| 2003/0040323 | A1 | 2/2003 | Pihl et al. |
| 2004/0203912 | A1 | 10/2004 | Budka et al. |
| 2005/0064876 | A1 | 3/2005 | Ruutu et al. |

(Continued)

OTHER PUBLICATIONS

Martin Hellebrandt & Rudolf Mathar, Location Tracking of Mobiles in Cellular Radio Networks, IEEE Transactions on Vehicular Technology, vol. 48, No. 5, Sep. 1999.

(Continued)

*Primary Examiner* — Dinh P Nguyen
(74) *Attorney, Agent, or Firm* — Cha & Reiter, LLC

(57) ABSTRACT

An electronic device apparatus and method are disclosed herein. The apparatus includes a processor. The processor may execute the method, which includes detecting a first location and a movement velocity of the electronic device, estimating a second location of the electronic device based on the detected movement velocity of the electronic device, comparing the first location of the electronic device and the estimated second location of the electronic device to determine a location measurement error, and correcting the detected first location of the electronic device based on the determined location measurement error.

18 Claims, 18 Drawing Sheets

(56) References Cited

U.S. PATENT DOCUMENTS

| | | | |
|---|---|---|---|
| 2006/0232466 A1* | 10/2006 | Park | G01S 19/48 342/357.4 |
| 2006/0240839 A1 | 10/2006 | Chen et al. | |
| 2006/0240840 A1 | 10/2006 | Morgan et al. | |
| 2007/0258420 A1 | 11/2007 | Alizadeh-Shabdiz et al. | |
| 2007/0258421 A1 | 11/2007 | Alizadeh-Shabdiz et al. | |
| 2007/0259624 A1 | 11/2007 | Alizadeh-Shabdiz et al. | |
| 2007/0287473 A1* | 12/2007 | Dupray | H04W 4/02 455/456.1 |
| 2008/0008120 A1 | 1/2008 | Alizadeh-Shabdiz | |
| 2008/0008121 A1 | 1/2008 | Alizadeh-Shabdiz | |
| 2008/0132170 A1 | 6/2008 | Alizadeh-Shabdiz et al. | |
| 2008/0274750 A1 | 11/2008 | Carlson et al. | |
| 2009/0075672 A1 | 3/2009 | Jones et al. | |
| 2009/0192015 A1 | 7/2009 | Lee et al. | |
| 2009/0227266 A1* | 9/2009 | Baik | G01S 5/0294 455/456.1 |
| 2009/0252138 A1 | 10/2009 | Alizadeh-Shabdiz et al. | |
| 2009/0303112 A1 | 12/2009 | Alizadeh-Shabdiz | |
| 2009/0303115 A1 | 12/2009 | Alizadeh-Shabdiz | |
| 2009/0310585 A1 | 12/2009 | Alizadeh-Shabdiz | |
| 2009/0310593 A1* | 12/2009 | Sheynblat | H04J 3/0638 370/350 |
| 2009/0312035 A1 | 12/2009 | Alizadeh-Shabdiz | |
| 2011/0058495 A1 | 3/2011 | Alizadeh-Shabdiz et al. | |
| 2011/0077030 A1 | 3/2011 | Wigren et al. | |
| 2011/0080841 A1 | 4/2011 | Alizadeh-Shabdiz et al. | |
| 2011/0156954 A1 | 6/2011 | Roh et al. | |
| 2011/0164522 A1 | 7/2011 | Alizadeh-Shabdiz et al. | |
| 2011/0294510 A1 | 12/2011 | Wigren et al. | |
| 2011/0298659 A1 | 12/2011 | Alizadeh-Shabdiz | |
| 2012/0040685 A1 | 2/2012 | Escolar-Piedras et al. | |
| 2012/0100872 A1 | 4/2012 | Alizadeh-Shabdiz et al. | |
| 2012/0149400 A1 | 6/2012 | Paek et al. | |
| 2012/0157123 A1 | 6/2012 | Li et al. | |
| 2012/0208549 A1* | 8/2012 | Lau | G01S 5/02 455/456.1 |
| 2012/0232837 A1 | 9/2012 | Li | |
| 2012/0309420 A1 | 12/2012 | Morgan et al. | |
| 2013/0085628 A1 | 4/2013 | Li et al. | |
| 2013/0137448 A1 | 5/2013 | Shen | |
| 2014/0375497 A1* | 12/2014 | Friend | G01S 19/14 342/357.51 |
| 2015/0105097 A1* | 4/2015 | Sun | H04W 64/003 455/456.1 |

OTHER PUBLICATIONS

Neal Patwari, Joshua N. Ash, Spyros Kyperountas, Alfred O. Hero III, Randolph L. Moses, & Neiyer S. Correal, Locating the Nodes, IEEE Signal Processing Magazine, Jul. 2005.

Henk Wymeersch, Jaime Lien, & Moe Z. Win, Cooperative Localization in Wireless Networks, IEEE 2009, Institute of Electrical and Electronics Engineers, vol. 97, No. 2, Feb. 2009.

Paul A. Zandbergen, Accuracy of iPhone Locations: A Comparison of Assisted GPS, WiFi and Cellular Positioning, Transactions in GIS, 2009, 13(s1): 5-26, 2009 Blackwell Publishing Ltd.

Yu-Chung Chen, Chun-Ting Chou, & Chun-Yu Chen, Cooperative Localization for Wireless and Mobile Social Networking Service (SNS), 2011 IEEE.

Victor H. Google's New Location APIs: The Biggest Change to Location Since Android Launched, Google Developers via the Next Web, May 17, 2013. http://www.phonearena.com/news/Googles-new-location-APIs-the-biggest-change-to-location-since-Android-launched_id43153.

NRC at Nokia World 2010: Indoor Navigation, Nokia Research Center, http://research.nokia.com/news/9505.

* cited by examiner

METHOD AND APPARATUS FOR ESTIMATING LOCATION OF ELECTRONIC DEVICE

CROSS-REFERENCE TO RELATED APPLICATION

This application claims priority under 35 U.S.C. §119(a) to Korean Application Serial No. 10-2014-0049389, which was filed in the Korean Intellectual Property Office on Apr. 24, 2014, the entire content of which is hereby incorporated by reference.

TECHNICAL FIELD

The present disclosure relates to a method and an apparatus for measuring and correcting a location of an electronic device.

BACKGROUND

According to the rapid development of Internet and mobile communication technologies and the propagation of Personal Digital Assistants (PDAs), notebooks, and smart phones, a Location Based Service (LBS) has been developed as a main application of a mobile communication field. The LBS is a service for easily and quickly providing various pieces of information related to a location of a user through wireless communication to a user who is moving, and may be used for efficiently tracking a moving person or vehicle. Alternatively, the LBS may be used for providing to a guardian a current location or a movement path of their ward, such as children or the elderly, or infirm.

A location tracking technology related to the LBS may be divided into a network-based method and a handset-based method. A positioning scheme of the network-based method includes Time Difference of Arrival (TDOA), Observed Time Difference of Arrival (OTDOA), Angle of Arrival (AOA), and RF (e.g., radio) fingerprint, and a positioning scheme of the handset-based method includes Time of Arrival (TOA) using Global Positioning System (GPS) or Assisted GPS (A-GPS).

SUMMARY

A location providing server may calculate a location of a terminal through a location providing algorithm using a parameter measured by the terminal based on a conventional A-GPS, OTDOA, or fingerprint scheme. Recently, methods of reducing network load and storing information on signal intensity from an adjacent evolved Node B (eNB) or an Access Point (AP) in order to identify a Point of Interest (POI) by the terminal, or methods of receiving limited eNB location information from a server and directly calculating a location of the terminal by the terminal, are considered.

When the terminal calculates the location of the terminal based on signal intensity information from the adjacent eNB or AP, location measurement accuracy may deteriorate due to obstacles such as multipath, adjacent interference, path attenuation, shadowing, or the like.

However, a GPS, A-GPS, Network Location Provider (NLP) scheme, which has more accurate location estimation in comparison with the case where the terminal calculates the location based on signal intensity information from the adjacent eNB or AP, causes large power consumption.

Accordingly, various embodiments of the present disclosure may provide a method and an apparatus for minimizing the power consumption of an electronic device in location estimation and estimating accurate location information.

Various embodiments of the present disclosure may provide a method and an apparatus for correcting a currently measured location of the electronic device by using relative location change information.

Various embodiments of the present disclosure may provide a method and an apparatus for correcting a location measurement error of the electronic device by using the velocity and movement of the electronic device and providing location information of the electronic device based on an error level.

Various embodiments of the present disclosure may provide a method and an apparatus for updating the coordinates of an absolute location of the electronic device according to whether the electronic device is moving, the movement velocity of the electronic device, or eNB information, and reducing power consumption by minimizing frequent location measurement.

In accordance with one aspect of the present disclosure, a method in an electronic device is disclosed, including detecting a first location and a movement velocity of the electronic device, estimating a second location of the electronic device based on the detected movement velocity of the electronic device, comparing the first location of the electronic device and the estimated second location of the electronic device to determine a location measurement error, and correcting the detected first location of the electronic device based on the determined location measurement error.

In accordance with another aspect of the present disclosure, an apparatus for estimating a location in an electronic device is disclosed, including a processor. The processor may execute detecting a first location and a movement velocity of the electronic device, estimating a second location of the electronic device based on the detected movement velocity of the electronic device, comparing the first location of the electronic device and the estimated second location of the electronic device to determine a location measurement error, and correcting the detected first location of the electronic device based on the determined location measurement error.

In accordance with another aspect of the present disclosure, a method of estimating a location of an electronic device is provided. The method includes determining whether an absolute location of the electronic device can be estimated based on a first location estimation method, when the absolute location of the electronic device cannot be estimated based on the first location estimation method, estimating a relative location of the electronic device from a predetermined reference location based on a second location estimation method, and when the absolute location of the electronic device can be estimated based on the first location estimation method, correcting the estimated absolute location into the relative location of the electronic device.

BRIEF DESCRIPTION OF THE DRAWINGS

The present disclosure will be more apparent from the following detailed description taken in conjunction with the accompanying drawings, in which.

DETAILED DESCRIPTION

Figure 1:
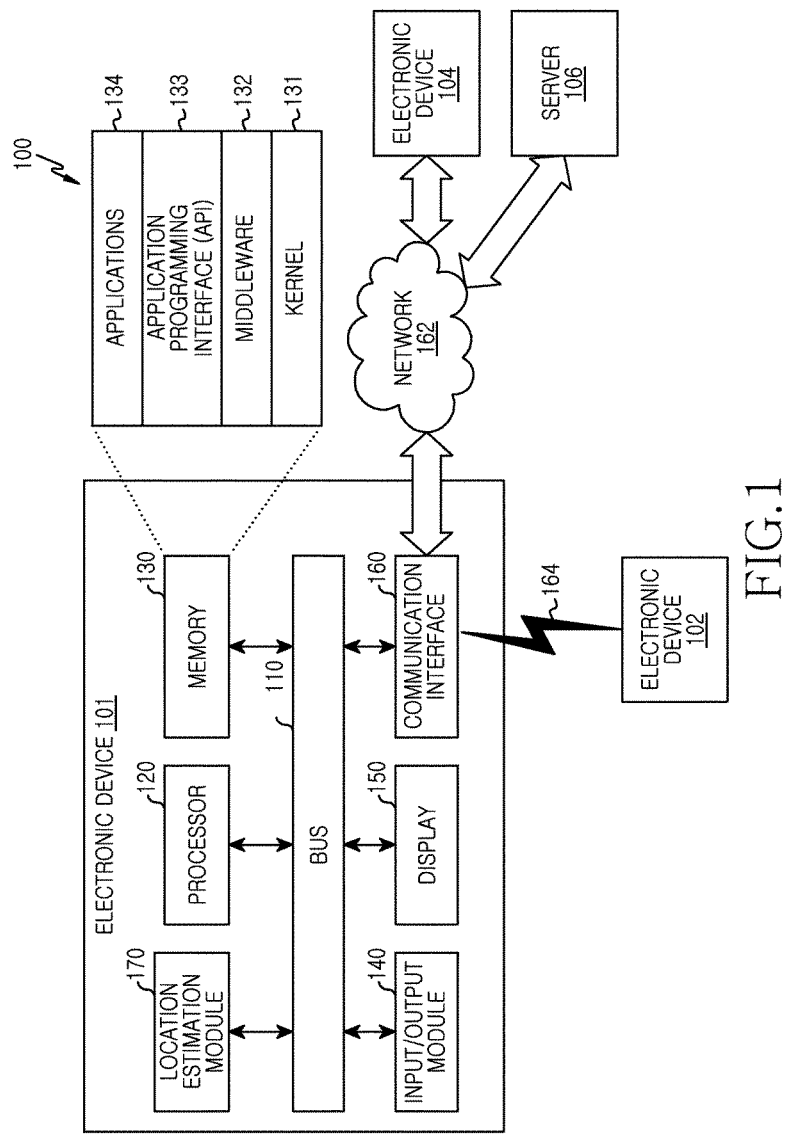
FIG. 1 illustrates a network environment including an example electronic device according to various embodiments of the present disclosure.

Hereinafter, various embodiments of the present disclosure will be described with reference to the accompanying drawings. The present disclosure may be modified in various forms and include various embodiments, but specific examples are illustrated in the drawings and described in the description. However, the description is not intended to limit the present disclosure to the specific embodiments, and it shall be appreciated that all the changes, equivalents and substitutions belonging to the present disclosure are included in the present disclosure. In the description of the drawings, identical or similar reference numerals are used to designate identical or similar elements.

The term "include" or "may include" refers to the existence of a corresponding disclosed function, operation or component which can be used in various embodiments of the present disclosure and does not limit one or more additional functions, operations, or components. Further, as used in embodiment of the present disclosure, the terms "include", "have" and their conjugates may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "or" used in various embodiments of the present disclosure includes any or all of combinations of listed words. For example, the expression "A or B" may include A, may include B, or may include both A and B.

The expression "1", "2", "first", or "second" used in various embodiments of the present disclosure may modify various components of various embodiments but does not limit the corresponding components. For example, the above expressions do not limit the sequence and/or importance of the corresponding elements. The expressions may be used to distinguish a component element from another component element. For example, a first user device and a second user device indicate different user devices although both of them are user devices. For example, without departing from the present disclosure, a first component element may be named a second component element. Similarly, the second component element also may be named the first component element.

It should be noted that if it is described that one component element is "coupled" or "connected" to another component element, the first component element may be directly coupled or connected to the second component, and a third component element may be "coupled" or "connected" between the first and second component elements. Conversely, when one component element is "directly coupled" or "directly connected" to another component element, it may be construed that a third component element does not exist between the first component element and the second component element.

In the present disclosure, the terms are used to describe a specific embodiment, and are not intended to limit the present disclosure. As used herein, the singular forms are intended to include the plural forms as well, unless the context clearly indicates otherwise.

Unless defined differently, all terms used herein, which include technical terminologies or scientific terminologies, have the same meaning as a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

An electronic device according to various embodiments of the present disclosure may be a device with a communication function. For example, the electronic device may include at least one of a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical device, a camera, a wearable device (e.g., a head-mounted-device (HMD) such as electronic glasses, electronic clothes, an electronic bracelet, an electronic necklace, an electronic appcessory, an electronic tattoo, or a smart watch).

According to an embodiment, an electronic device may be a smart home appliance with a communication function. The smart home appliance as an example of the electronic device may include at least one of, for example, a television, a Digital Video Disk (DVD) player, an audio system, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, or an electronic picture frame.

According to some embodiments, the electronic device may include at least one of various medical appliances (e.g. Magnetic Resonance Angiography (MRA), Magnetic Resonance Imaging (MRI), Computed Tomography (CT) machine, and an ultrasonic machine), navigation devices, Global Positioning System (GPS) receivers, Event Data Recorders (EDRs), Flight Data Recorders (FDRs), automotive infortainment devices, electronic equipment for ships (e.g. navigation equipment for ships, gyrocompasses, or the like), avionics, security devices, head units for vehicles, industrial or home robots, Automatic Teller Machines (ATM) of banking facilities, or Point Of Sales (POSs) of shops.

According to another embodiment, the electronic devices may include at least one of furniture or a part of a building/structure having a communication function, electronic boards, electronic signature receiving devices, projectors, or various measuring equipment (e.g., equipment for a water supply, an electricity, gases or radio waves). An electronic device according to various embodiments of the present disclosure may be a combination of one or more of above described various devices. Also, an electronic device according to various embodiments of the present disclosure may be a flexible device. Also, an electronic device according to various embodiments of the present disclosure is not limited to the above described devices.

Hereinafter, an electronic device according to various embodiments of the present disclosure will be described with reference to the accompanying drawings. In various embodiments, the term "user" may indicate a person using an electronic device or a device (e.g. an artificial intelligence electronic device) using an electronic device.

FIG. 1 illustrates a network environment 100 including an electronic device 101 according to various embodiments. Referring to FIG. 1, the electronic device 101 may include a bus 110, a processor 120, a memory 130, an input/output interface 140, a display 150, a communication interface 160, and a location estimation module 170.

The bus 110 may be a circuit for connecting the aforementioned components and transmitting communication (for example, a control message) between the aforementioned components.

For example, the processor 120 may receive instructions from the aforementioned other components (for example, the memory 130, the input/output interface 140, the display 150, the communication interface 160, or the location estimation module 170) through the bus 110, decode the received instructions, and perform calculations or data processing according to the decoded instructions.

The memory 130 may store instructions or data received from, or created by, the processor 120 or other components (for example, the input/output interface 140, the display 150, the communication interface 160, or the location estimation module 170).

The memory 130 may include programming modules, for example, a kernel 131, middleware 132, an Application Programming Interface (API) 133, and applications 134. Each of the programming modules described above may be formed of software, firmware, and hardware, or a combination thereof.

The kernel 131 may control or manage system resources (for example, the bus 110, the processor 120, or the memory 130) used for executing an operation or a function implemented in the remaining other programming modules, for example, the middleware 132, the API 133, or the applications 134. In addition, the kernel 131 may provide an interface through which the middleware 132, the API 133, or the applications 134 may access the individual components of the electronic device 101 to control or manage the individual components.

The middleware 132 may serve as an intermediary which allows the API 133 or the applications 134 to communicate with the kernel 131 to exchange data with the kernel 131. Furthermore, in regard to task requests received from the applications 134, the middleware 132 may perform a control (for example, scheduling or load balancing) for the task requests, using a method such as allocating at least one of the applications 134 a priority for using the system resources (for example, the bus 110, the processor 120, and the memory 130) of the electronic device 101.

The API 133 is an interface through which the applications 134 may control functions provided by the kernel 131 and the middleware 132, and may include at least one interface or function (for example, instruction) for file control, window control, image processing, or text control.

According to various embodiments, the applications 134 may include a Short Message Service (SMS)/Multimedia Message Service (MMS) application, an e-mail application, a calendar application, an alarm application, a health care application (for example, an application for measuring an amount of exercise or blood sugar), and an environmental information application (for example, an application for providing an atmospheric pressure, humidity, temperature, and the like). Additionally or alternately, the applications 134 may include an application related to an information exchange between the electronic device 101 and an external electronic device (for example, an electronic device 102 or an electronic device 104). The application related to the information exchange may include, for example, a notification relay application for transferring particular information to the external electronic device, or a device management application for managing the external electronic device.

For example, the notification relay application may include a function of transferring, to the external electronic device (for example, the electronic device 102 or the electronic device 104), notification information generated from other applications of the electronic device 101 (for example, an SMS/MMS application, an e-mail application, a health management application, an environmental information application, and the like). In addition, the notification relay application may receive the notification information from, for example, the external electronic device (for example, the electronic device 102 or the electronic device 104), and may provide the received notification information to a user. The device management application may manage (for example, install, delete, or update), for example, at least some functions (for example, a function of turning on/off an external electronic device (or some components thereof) or a function of adjusting the brightness (or resolution) of a display) of the external electronic device (for example, the electronic device 102 or the electronic device 104) that communicates with the electronic device 101, applications executed in the external electronic device, or services (for example, a phone call service or a message service) provided by the external electronic device.

According to various embodiments, the applications 134 may include an application designated according to attributes (for example, the type of electronic device) of the external electronic device (for example, the electronic device 102 or the electronic device 104). For example, when the external electronic device is an MP3 player, the applications 134 may include an application related to the reproduction of music. Similarly, when the external electronic device is a mobile medical appliance, the applications 134 may include an application related to health care. According to one embodiment, the applications 134 may include at least one of an application designated to the electronic device 101 or an application received from the external electronic device (for example, a server 106, the electronic device 102, or the electronic device 104).

The input/output interface 140 may transfer instructions or data input by the user through a sensor (for example, an acceleration sensor or a gyro sensor) or an input device (for example, a keyboard or a touch screen) to the processor 120, the memory 130, the communication interface 160, or the location estimation module 170 through, for example, the bus 110. For example, the input/output interface 140 may provide the processor 120 with data for a user's touch input through the touch screen. Furthermore, through the output device (for example, a speaker or a display), the input/output interface 140 may output instructions or data received from the processor 120, the memory 130, the communication interface 160, or the location estimation module 170 through the bus 110. For example, the input/output interface 140 may output voice data, processed through the processor 120 to the user through a speaker.

The display 150 may display various pieces of information (for example, multimedia data or text data) for the user.

The communication interface 160 may connect communication between the electronic device 101 and the external electronic device (for example, the electronic device 102, the electronic device 104, or the server 106). For example, the communication interface 160 may support network communication 162 (for example, Internet, Local Area Network (LAN), Wide Area Network (WAN), telecommunication network, cellular network, satellite network, or Plain Old Telephone Service (POTS)), short-range communication 164 (for example, WiFi, BlueTooth (BT), or Near Field Communication (NFC)), or wired communication (for example, Universal Serial Bus (USB), High Definition Multimedia Interface (HDMI), Recommended Standard (RS)-232, or POTS). According to one embodiment, a protocol (for example, a short-range communication protocol, a network communication protocol, or a wired communication protocol) for communication between the electronic device 101 and the external device may be supported by at least one of the API 133 and the middleware 132. Each of the electronic devices 102 and 104 may be a device which is the same as the electronic device 101 (for example, the same type device) or another device (for example, a different type device).

The location estimation module 170 may process at least some pieces of information acquired from other components (for example, the processor 120, the memory 130, the input/output interface 140, and the communication interface 160), and may provide the processed information to the user through various methods. For example, the location estimation module 170 may estimate an absolute location of the electronic device 101 by using the processor 120 or independently from the processor 120, and correct the absolute location of the electronic device 101 by using a movement velocity and a location estimation error of the electronic device 101. Additional information on the location estimation module 170 may be provided with reference to FIGS. 2 through 18 described below.

Figure 2:
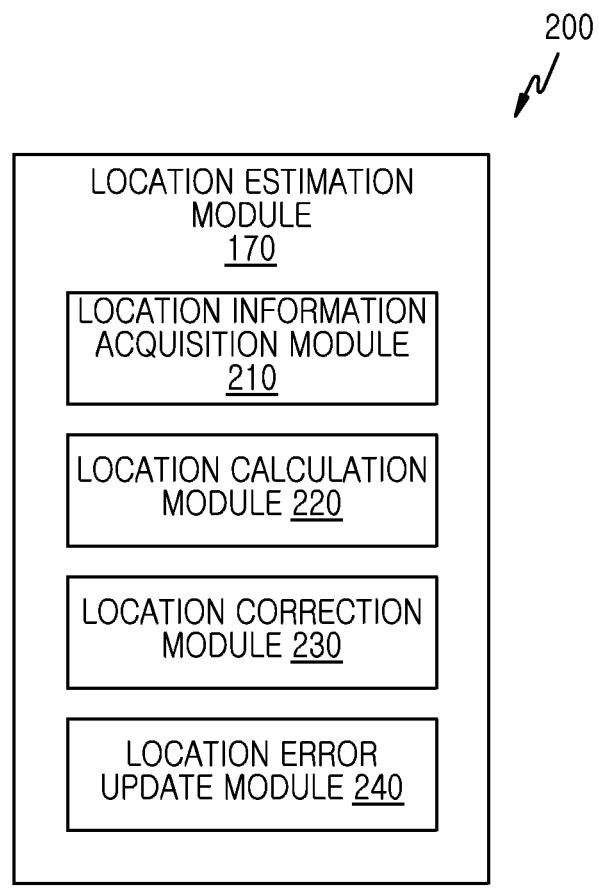
FIG. 2 illustrates in detail a location estimation module of an example electronic device according to various embodiments of the present disclosure.

FIG. 2 is a block diagram 200 of an example location estimation module 170 of the electronic device (for example, the electronic device 101) according to various embodiments of the present disclosure. Referring to FIG. 2, the location estimation module 170 may include a location information acquisition module 210, a location calculation module 220, a location correction module 230, and a location error update module 240.

The location information acquisition module 210 may acquire adjacent evolved Node B (eNB) location information for calculating the location of the electronic device and signal intensity information of the eNB, or GPS information. Further, the location information acquisition module 210 may acquire information for estimating the velocity of the electronic device (for example, a Doppler frequency, sampling information from a sensor related to velocity measurement, or location change value of the electronic device).

According to one embodiment, the location of the electronic device may be acquired using a GPS, A-GSP, NLP or the like. According to various embodiments, when it is determined that the electronic device is located in a shaded area or inside a building, the location of the electronic device may be acquired based on adjacent eNB location information received from a server or estimated within the electronic device and signal intensity information of the eNB. For example, when Tracking Area Update (TAU) or Tracking Area Code (TAC)/Location Area Code (LAC) changes in a Long Term Evolution (LTE) system, the electronic device may report a serving eNB cell identifier and adjacent Tracking Area Identity (TAI) list information to a server, so as to acquire eNB location information within a radius (within several km) or eNB location information within the requested TAI list from the server.

According to other various embodiments, when the number of effective eNBs adjacent to the electronic device is not sufficient, the electronic device may acquire adjacent eNB location information by using an absolute information thereof and eNB signal intensity.

According to one embodiment, the information for estimating the velocity of the electronic device may be acquired using an acceleration sensor, a gyroscope, or a pedometer sensor. According to various embodiment, when a sensor module that may estimate a velocity is not installed or cannot be used, the velocity of the electronic device may be acquired using a change in the location of the electronic device based on the adjacent eNB location information and signal intensity. Alternatively, the information for estimating the velocity of the electronic device may be acquired based on a Doppler frequency or Doppler's shift.

The location calculation module 220 may calculate the location of the electronic device by using adjacent eNB location information and the eNB signal intensity information for calculating the location of the electronic device from the location information acquisition module 210, or GPS information.

According to one embodiment, when the position is calculated using the GPS, the location calculation module 220 may measure accurate time and distances from three or more satellites, and then calculate the location of the electronic device according to triangulation using the three different distances.

According to various embodiment, the location calculation module 220 may calculate the location of the electronic device by using location information or signal intensities of three or more eNBs including a serving eNB or APs which are close to the electronic device (or which have a good electric field or signal strength).

When the number (for example, three or more) of effective adjacent eNBs is not enough, the location calculation module 220 may calculate the location of the electronic device by using a weighted centroid estimation scheme based on signal intensity. The weighted centroid estimation scheme corresponds to a method of calculating the location of the electronic device by applying a weighting to the location of the eNB according to a distance between the electronic device and the eNB (or AP) or eNB signal intensity.

According to various embodiment, when the eNBs are synchronized, the electronic device may measure a Received Signal Timing Difference (RSTD) value in a Line of sight (LOS) having a visible straight line in order to measure the distance between the electronic device and the adjacent eNB, and calculate the location based on triangulation or trilateration. A distance from a serving cell may be determined through Timing Advance (TA).

In the LTE system, the RSTD may be determined or detected through a Positioning Reference Signal (PRS) and a Cell-specific Reference Signal (CRS). According to various embodiments of the present invention, the RSTD may also be acquired using a Primary Synchronization Signal (PSS) or a Secondary Synchronization Signal (SSS), which is a synchronization signal of the LTE system.

When the RSTD of the adjacent eNB is measured, a measurement error may be generated by high interference of the serving eNB. Accordingly, the electronic device may increase a reception probability through the performance of Chase Combining (CC). As the eNB density is lower or a channel state of the eNB further deteriorates, the number of combinations may be increased.

When the signal intensity of the serving cell is very strong, the location of the electronic device may be determined using the weighted centroid based on the assumption that the electronic device is located close to the serving cell.

For example, an average value of location values of selected adjacent eNBs may be determined as the location of the electronic device, and the location of the electronic device may be calculated using the weighted centroid, as generated by applying weightings corresponding to signal intensity of the selected adjacent eNBs and the electronic device and distances between the electronic device and the eNBs to locations of the adjacent eNBs. When the weighted centroid is calculated, if signal intensities of two or more adjacent eNBs are not detected, the same weighting may be applied.

When a general path attenuation model is used, the distance between the electronic device and each eNB is calculated in consideration of a statistically determined path attenuation index and transmission power of the eNB (or AP), and the weighting may be applied in inverse proportion to the distance as shown in equation (1).

$$\bar{x} = \frac{r_2 r_3 X_1 + r_3 r_1 X_2 + r_1 + r_2 X_3}{r_2 r_3 + r_3 r_1 + r_1 r_2}, \bar{y} = \frac{r_2 r_3 Y_1 + r_3 r_1 Y_2 + r_1 r_2 Y_3}{r_2 r_3 + r_3 r_1 + r_1 r_2} \quad (1)$$

In equation (1), ri denotes a distance between the electronic device and an ith eNB, and Xi and Yi denote longitude and latitude of the ith eNB, respectively. The eNB transmission power and path attenuation index may be determined using eNB broadcasting information. In LTE, eNB transmission power information may be identified based on SIB2 information and the path attenuation index may be determined based on received signal intensity and frequency information.

According to various embodiments, after a distance between the electronic device and each eNB is calculated using a timing offset of the RSTD and Timing Advance (TA), the location of the electronic device may be determined by applying a weighting in inverse proportion to each distance.

Since the accuracy of the weighted centroid decreases according to the adjacent eNB (or AP) density, location information of the electronic device may be calculated or corrected based on information on the velocity of the electronic device and information on determination whether the electronic device has movement. For example, when it is determined that the electronic device is moving, the electronic device may determine the location of the electronic device by estimating the speed of the electronic device (e.g., through a Doppler frequency) and estimating a direction vector based on current location information and previous location information.

The location error update module 240 may determine a difference (hereinafter, referred to as a "location measurement error level") between the location (hereinafter, referred to as an "absolute location" or a "first location") measured based on triangulation or trilateration using a GPS, or the weighted centroid estimation scheme and the location (hereinafter, referred to as a "relative location" or a "second location") of the electronic device measured, based on the movement velocity of the electronic device. That is, the relative location or the second location may indicate how much the electronic device has moved from a previous location based on the speed and direction of the electronic device.

According to one embodiment, the location error update module 240 may receive adjacent eNB density information from the server and then reflect the adjacent eNB density information, so as to determine a measurement error level of an average location value.

The location correction module 230 may correct the location of the electronic device calculated by the location calculation module 220 by using the velocity of the electronic device provided from the location information acquisition module 210 and the location measurement error level provided from the location error update module 240.

For example, the location correction module 230 may update the location of the electronic device by using the velocity of the electronic device or update the location of the electronic device by using a "Kalman filter," considering the location measurement error level and the velocity of the electronic device.

Figure 3:
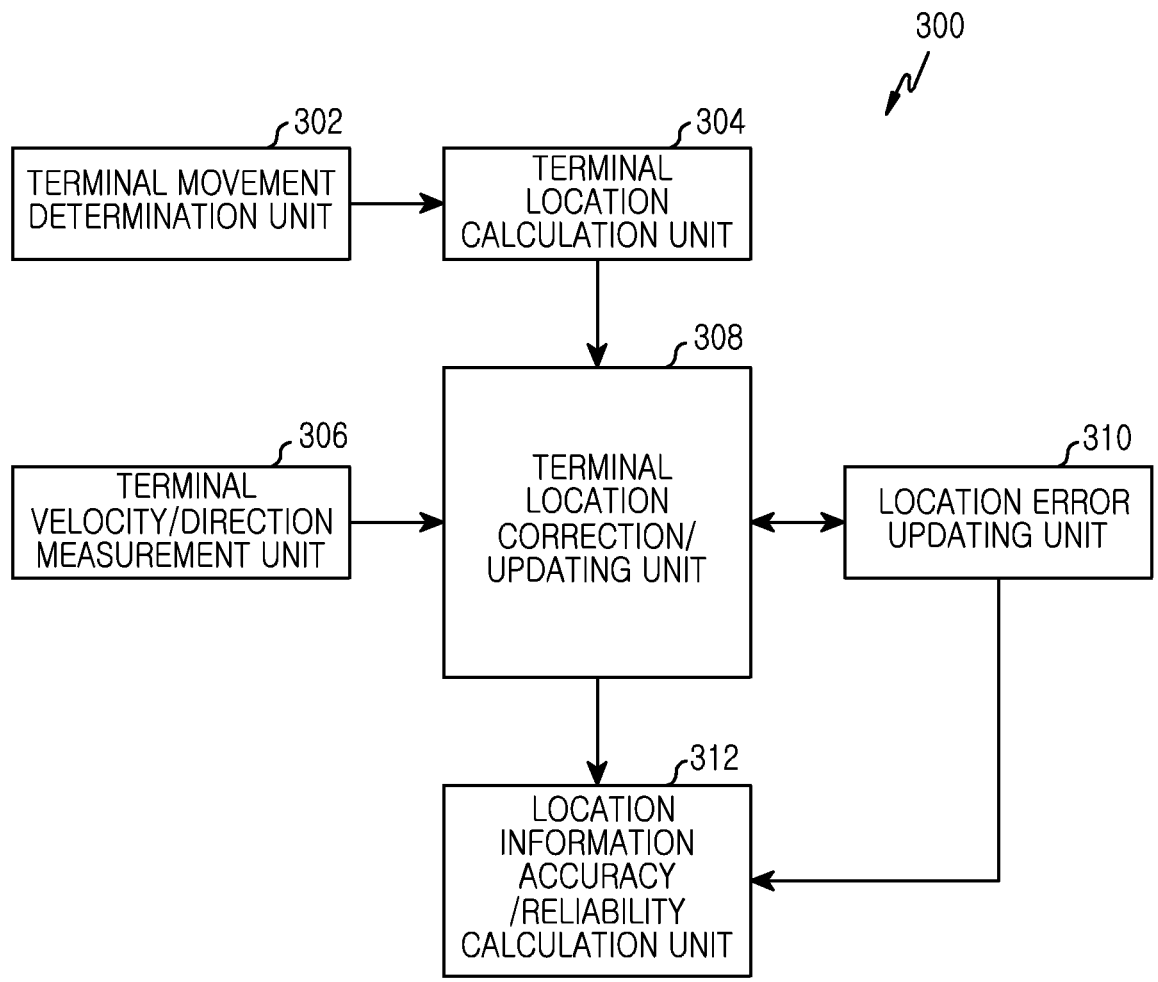
FIG. 3 illustrates an example modules for correcting location information of an electronic device in consideration of a velocity and direction of the electronic device, and whether the electronic device is moving according to various embodiments of the present disclosure.

FIG. 3 illustrates example components for correcting location information of the electronic device in consideration of the velocity and direction of the electronic device, and whether the electronic device is moving according to various embodiments of the present disclosure.

Referring to FIG. 3, the elements 300 of estimating a location of the electronic device 101 may include a "terminal movement determination unit" 302 for determining whether the terminal is moving, a "terminal velocity/direction measurement unit" 306 for measuring a speed and direction of the terminal according to the movement of the terminal, a "terminal location calculation unit" 304 for calculating a location of the terminal, a "terminal location correction/updating unit" 308 for correcting/updating the location of the terminal by using a Kalman filter considering the speed and direction of the terminal, a "location information accuracy/reliability calculation unit" 312 for calculating accuracy or reliability of information on the corrected/updated location of the terminal, and a "location error updating unit" 310 for updating a location error by using a difference between the calculated location of the terminal and the updated location of the terminal.

According to various embodiments of the present disclosure, whether the terminal is moving may be determined using a Doppler frequency. For example, when the Doppler frequency is larger than or equal to a threshold, it may be determined that the terminal is moving. According to one embodiment, whether the terminal is moving may be determined using an acceleration sensor or the like.

According to other various embodiments, when the updated location of the terminal maintains a predetermined distance from the previous location, it may be determined that the terminal has moved.

According to various embodiment, the location of the terminal may be calculated based on the GPS, A-GPS, or NLP, or calculated based on location information of adjacent eNBs. The terminal may receive the location information of the adjacent eNBs by transmitting a request to the server. The terminal may calculate the distance based on a location of the eNB and received signal intensity from the eNB (or Received Signal timing Difference or "RSTD") and calculate the location of the terminal through trilateration. Alternatively, the location of the terminal may be calculated by the location estimation scheme based on the weighted centroid.

According to various embodiments of the present disclosure, the location measurement value may be adaptively corrected according to the location measurement error level through the Kalman filtering and the velocity of the terminal.

According to various embodiments of the present disclosure, accuracy or reliability of the location information of the terminal may be determined based on a ratio between a level of location measurement error that is acceptable (e.g., within or sufficiently close to a target location measurement error level or threshold) and an updated location measurement error level.

Figure 4:
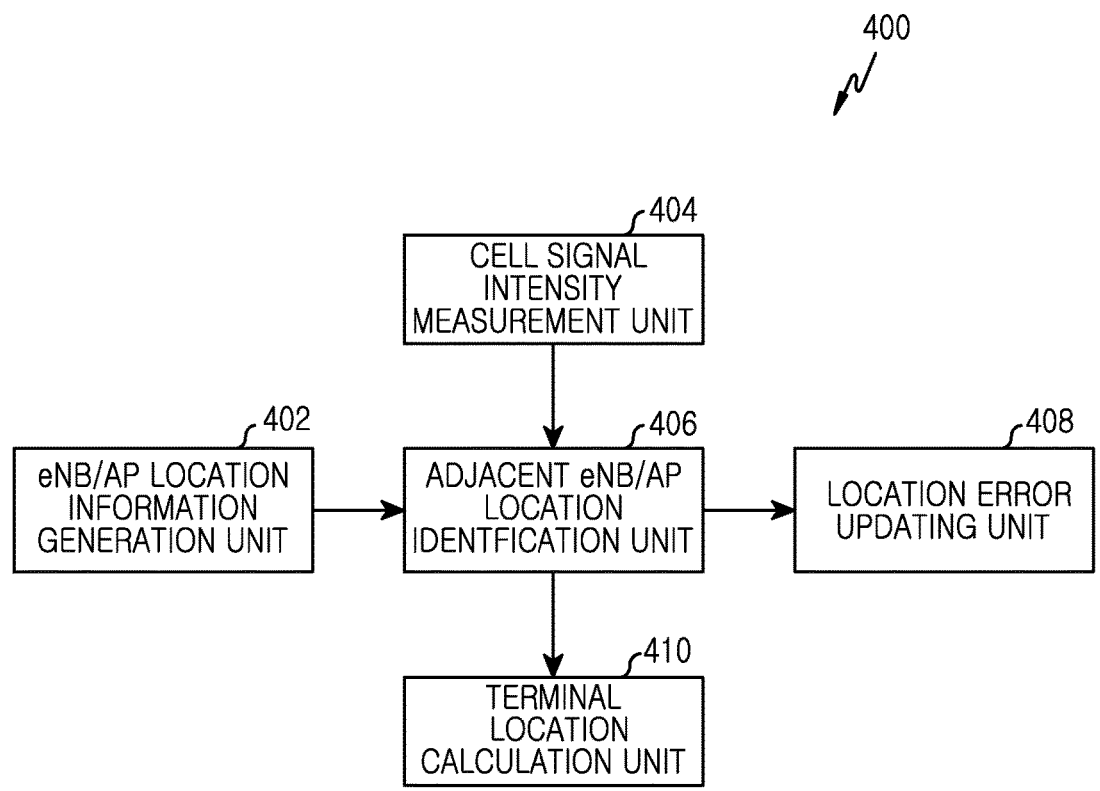
FIG. 4 illustrates example modules for calculating a location of an electronic device by using an eNB or AP location information database and signal intensity of an eNB according to various embodiments of the present disclosure.

FIG. 4 illustrates example components for calculating the location of the electronic device by using an eNB or AP location information database and signal intensity of the eNB according to various embodiments of the present disclosure.

Referring to FIG. 4, the example elements 400 of calculating the location of the electronic device may include an "eNB/AP location information generation unit" 402 for making location information of an eNB or an AP a database, a "cell intensity measurement unit" 404 for measuring signal intensity (or RSTD) of the eNB or AP, a "adjacent eNB/AP location identification unit" 406 for identifying location information of the eNB or AP and signal intensity of the eNB or AP, a "terminal location calculation unit" 410 for calculating a location of the terminal by using the location information of the eNB and AP or the signal intensity of the eNB or AP, and a "location error updating unit" 408 for updating a location error by using a difference between an absolute location (e.g., or a first location) of the measured terminal and a relative location (e.g., or a second location) of the measured terminal. As a location measurement error level is larger, an absolute location calculation period of the electronic device may become shorter. The absolute location of the terminal may refer to a location calculated based on a GPS, or locations or signal intensities of adjacent eNBs, and the relative location of the terminal may refer to a location of the terminal updated from a previous location according to a movement velocity of the terminal.

For example, the absolute location of the terminal may be calculated using trilateration using a distance between the terminal and adjacent eNBs, or calculated through a location estimation scheme based on a weighted centroid in which the absolute location is calculated by applying a weighting according to the distance between the terminal and the adjacent eNBs.

Figure 5:
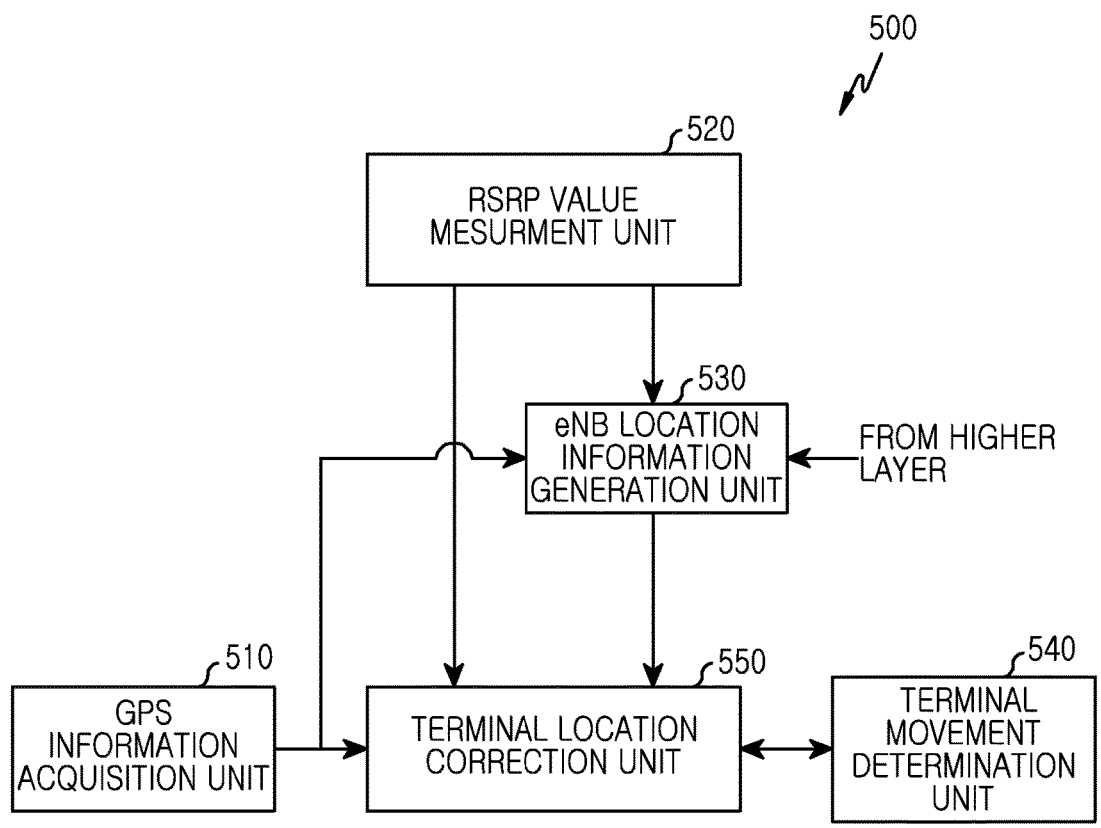
FIG. 5 illustrates example modules for measuring a location of an electronic device according to various embodiments of the present disclosure.

FIG. 5 illustrates example components for measuring the location of the electronic device according to various embodiments of the present disclosure.

Referring to FIG. 5, the example components 500 of measuring the location of the electronic device may include a "RSRP measurement unit" 520 for measuring Reference Signal Received Power (RSRP) (or Reference Signal Received Quality (RSRQ), Signal to Interference plus Noise Ratio (SINR), or Received Signal Strength Indicator or "RSSI") of serving and adjacent eNBs, an "eNB location information generation unit" 530 for receiving location information of adjacent eNBs from a server or measuring locations of the adjacent eNBs to make the location information of the adjacent eNBs as a database, a "GPS information acquisition unit" 510 for acquiring GPS information, a "terminal movement determination unit" 540 for determining a velocity of the terminal and whether the terminal is moving through a Doppler frequency, and a "terminal location correction unit" 550 for calculating the location of the terminal by using the location information of the adjacent eNBs and signal intensities of the adjacent eNBs, or calculating the location of the terminal by using the GPS information, and correcting the calculated location of the terminal according to the velocity of the terminal or whether the terminal is moving.

Figure 6:
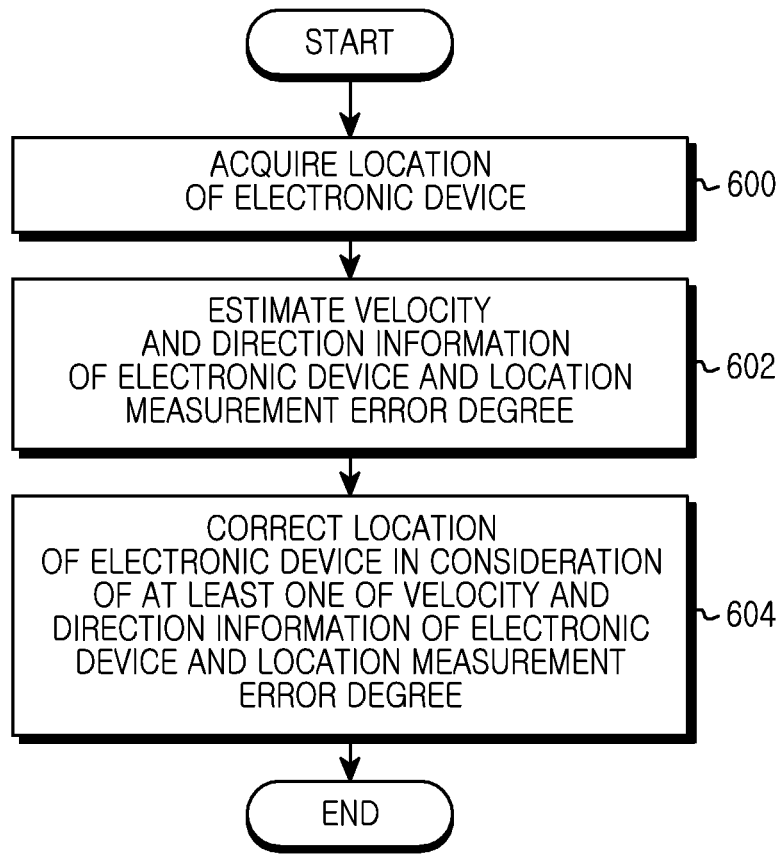
FIG. 6 is a flowchart illustrating an example process of measuring a location of an electronic device according to various embodiments of the present disclosure.

FIG. 6 is a flowchart illustrating an example process of measuring the location of the electronic device according to various embodiments of the present disclosure.

Referring to FIG. 6, the electronic device may acquire the location (e.g., or a first location) of the electronic device based on GPS information or location information and signal intensities of adjacent eNBs in operation 600. For example, the electronic device may measure an absolute location of the electronic device through a GPS receiver. However, when the GPS cannot be used, the electronic device may measure the absolute location of the electronic device by using the location information and signal intensities of the adjacent eNBs.

In various embodiments, the location information of the adjacent eNBs may be estimated through the absolute location of the electronic device calculated through the GPS receiver or acquired from a server by a request of the electronic device.

The electronic device may estimate velocity and direction information of the electronic device and a location measurement error in operation 602. According to various embodiments, the velocity of the electronic device may be estimated using a Doppler frequency or through a sensor, and the location measurement error level may be determined by a difference between the absolute location (e.g., the first location) of the electronic device and a relative location measured based on a movement distance from a previous location through the velocity of the electronic device.

The electronic device may correct the location of the electronic device by using the velocity and direction information of the electronic device and the location measurement error level in operation 604.

According to various embodiment, the electronic device determines whether the location of the electronic device is effective. When the location of the electronic device is not effective, the location of the electronic device may be updated based on the velocity and direction of the electronic device. When the location of the electronic device is effective, the location of the electronic device may be corrected by applying Kalman filtering.

Figure 7:
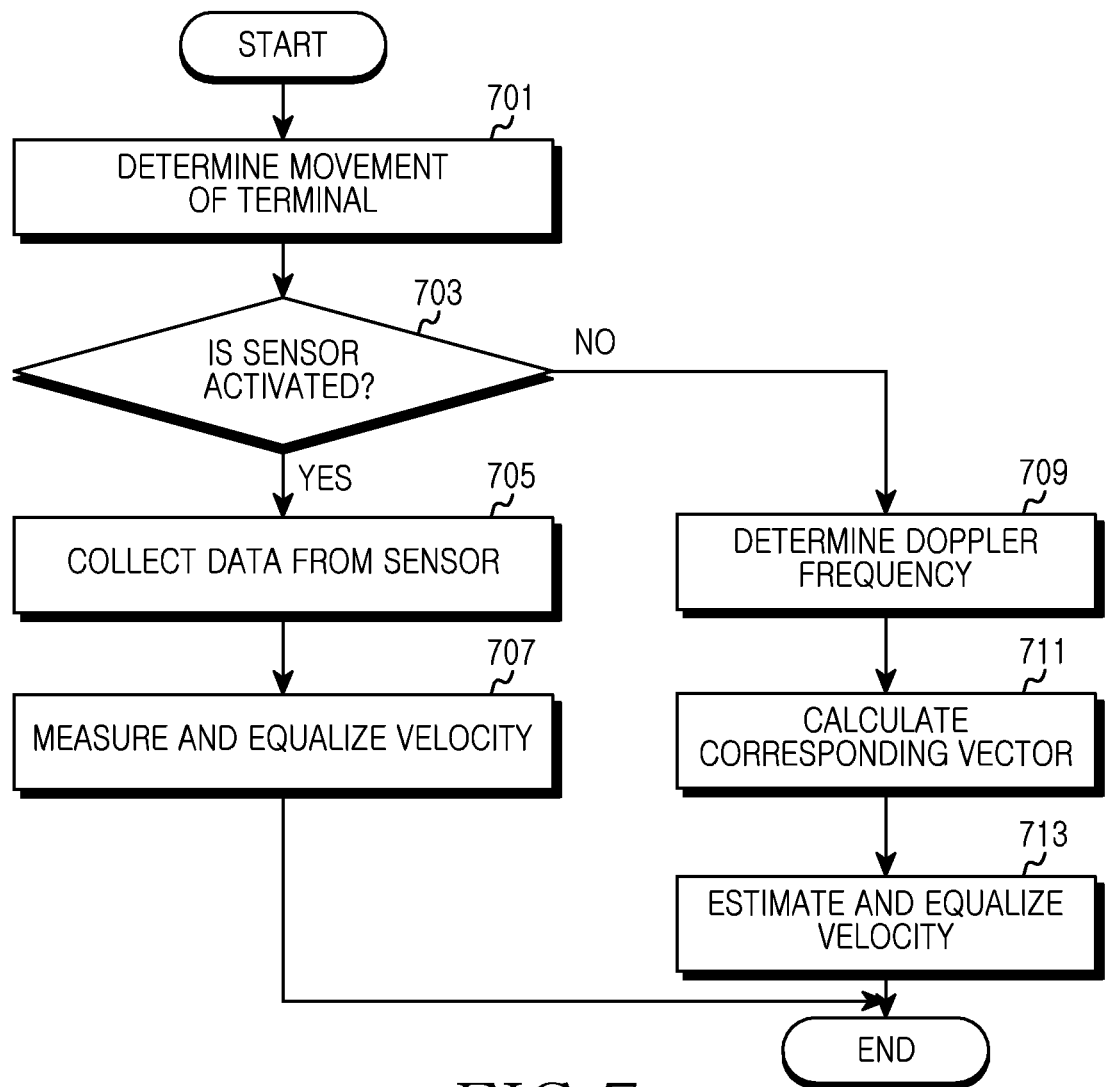
FIG. 7 is a flowchart illustrating an example process for measuring a velocity of an electronic device in consideration of the movement of the electronic device according to various embodiments of the present disclosure.

FIG. 7 is a flowchart illustrating an example process for measuring the velocity of the electronic device in consideration of movement of the electronic device according to various embodiments of the present disclosure.

Referring to FIG. 7, the electronic device may determine whether the electronic device is moving by using a Doppler frequency in operation 701. For example, the electronic device may determine that the electronic device is moving when the estimated Doppler frequency is larger than or equal to a threshold, and may determine that the electronic device is not moving when the estimated Doppler frequency is smaller than the threshold. The Doppler frequency may be estimated through various methods, and is not limited to one method in various embodiments of the present disclosure.

The electronic device may determine whether at least one sensor related to velocity measurement is activated in operation 703.

When at least one sensor related to the velocity measurement is activated, the electronic device may collect data from the sensor in operation 705, and measure the velocity based on the collected data in operation 707. In various embodiments, the velocity may be determined by an average value.

However, when at least one sensor related to the velocity measurement is not activated, the electronic device may measure a Doppler frequency in operation 709 and calculate a heading vector based on an RSRP in operation 711. For example, the electronic device may measure a change in the location of the electronic device based on location information and signal intensity of adjacent cells in order to calculate the heading vector from the current location. The electronic device may directly estimate the velocity from the heading vector, but the location estimation based on the signal intensity has a large measurement error in the location of the electronic device according to eNB density, a channel state, and an error level of the location information of adjacent eNBs. Accordingly, the size or magnitude of the velocity (e.g., for example, speed) may be calculated using the Doppler frequency or using data of the sensor when the sensor is activated, and information on a direction of the velocity may be estimated based on a velocity vector using the heading vector.

The electronic device may calculate a speed vector based on the measured Doppler frequency and calculate direction information based on the heading vector, so as to estimate the velocity (e.g., speed+direction) in operation 713. In various embodiments, the speed may be determined by an average value.

Figure 8:
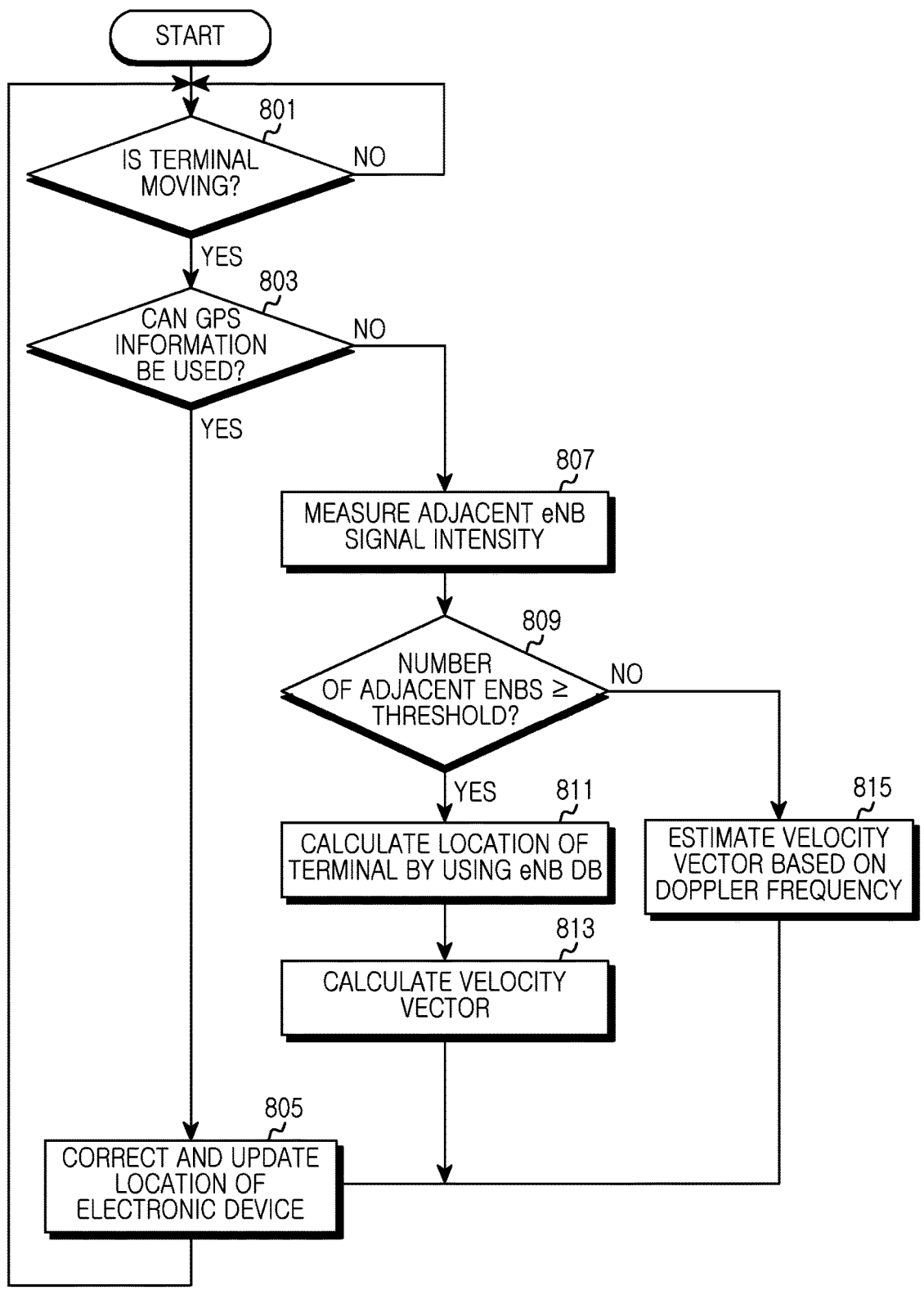
FIG. 8 is a flowchart illustrating an example process for correcting a location of an electronic device by using a velocity vector according to various embodiments of the present disclosure.

FIG. 8 is a flowchart illustrating an example process for correcting the location of the electronic device by using a velocity according to various embodiments of the present disclosure.

Referring to FIG. 8, the electronic device may determine whether the electronic device is moving by using a Doppler frequency or a sensor in operation 801. When the electronic device is moving, the electronic device may determine whether GPS information can be used in operation 803. For example, the electronic device may determine whether the GPS information acquired based on the velocity detected from the Doppler frequency or sensor is reliable.

When the electronic device is not moving, the location may not be estimated in a corresponding mode.

When the GPS information cannot be used, the electronic device may scan signals of adjacent eNBs to measure signal intensity in operation 807.

The electronic device may determine whether the number of detected adjacent eNBs is larger than or equal to a threshold (for example, 3). When the number of detected adjacent eNBs is larger than or equal to the threshold (for example, 3), the electronic device may calculate the location of the electronic device by using an eNB DB (for example, location information and signal intensity of adjacent eNBs) in operation 811.

The electronic device may calculate the velocity by using the Doppler frequency or sensor in operation 813.

However, when the number of detected adjacent eNBs is smaller than the threshold (for example, 3), the electronic device may calculate the velocity by using the Doppler frequency or sensor and may calculate the location of the electronic device using the velocity in operation 815. In various embodiments, the electronic device may calculate locations of adjacent eNBs by using a distance between the adjacent eNB and the electronic device corresponding to an absolute location of the electronic device.

The electronic device may correct/update the location of the electronic device by using location information of the electronic device estimated through the GPS information or location information of the electronic device estimated based on signal intensity of adjacent eNBs in operation 805. According to various embodiments, the location of the electronic device may be corrected or updated based on a Kalman filtering scheme in which a current value is estimated based on a value estimated at a previous time.

Figure 9:
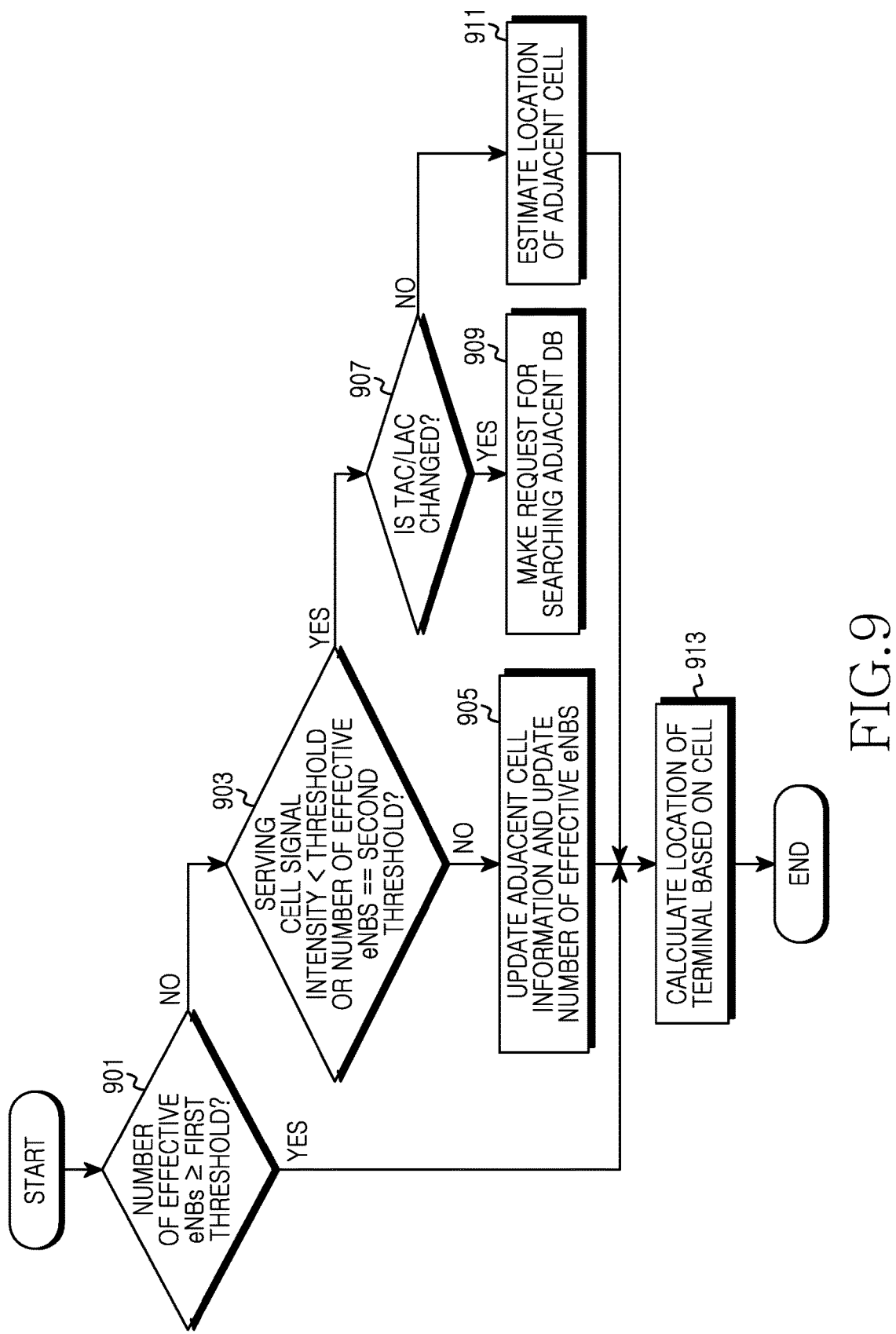
FIG. 9 is a flowchart illustrating an example process for calculating a location of an electronic device based on a cell according to the number of effective eNBs according to various embodiments of the present disclosure.

FIG. 9 is a flowchart illustrating an example process for calculating a location of the electronic device based on a cell according to the number of effective eNBs according to various embodiments of the present disclosure.

Referring to FIG. 9, the electronic device may determine whether the number of detected adjacent eNBs is larger than or equal to a threshold (e.g., for example, 3) in operation 901. When the number of detected adjacent eNBs is larger than or equal to the threshold (e.g., for example, greater than 3), the electronic device may calculate the location of the electronic device by using an eNB DB (e.g., location information and signal intensity of adjacent eNBs) in operation 913.

However, when the number of detected adjacent eNBs is equal to or smaller than a first threshold (e.g., for example, less than 3), the electronic device may determine whether serving cell signal intensity is smaller than a threshold or the number of effective eNBs is a second threshold (e.g., for example, 0) in operation 903. Here, the number of the effective eNBs indicates the number of eNBs which are greater than the threshold among the detected adjacent eNBs, and the detected adjacent eNBs may include at least one eNB among a detected adjacent eNBs previously.

When the serving cell signal intensity is not smaller than the threshold or when the number of effective eNBs is not the second threshold, the electronic device may update adjacent cell information and the number of effective eNBs in operation 905.

However, when the serving cell signal intensity is smaller than the threshold, or when the number of effective eNBs is 0, the electronic device may determine whether there is a change in a Tracking Area Code or "TAC"/Location Area Code or "LAC") in operation 907, and make request for searching an adjacent eNB DB in operation 909 when there is the change in the TAC/LAC.

However, when there is no change in the TAC/LAC, the electronic device may estimate the location of the eNB based on the absolute location of the electronic device in operation 911.

In various embodiments, the electronic device may calculate the location of the electronic device based on the location information of the adjacent eNB acquired through a request or the estimated location information of the adjacent eNB in operation 913.

For example, when there is the change in the TAC/LAC, the electronic device may report a cell ID of the serving eNB and adjacent TAI list information to the server, and the server may transmit location information of eNBs within a predetermined radius (within several km) or cell information within the requested TAI list to the electronic device as well as the reported eNB information. When the terminal is located in a boundary area of TA/LA, the terminal may use previous and current TA/LA information in order to minimize the number of server requests. Further, the terminal may manage a TAI list which is frequently visited.

In addition, the electronic device may calculate the location of the electronic device by using three or more close eNBs (having a good electric field or signal strength) including a serving cell or APs.

When the number (e.g., three or more) of effective adjacent eNBs is insufficient, the electronic device may calculate the location using a weighted centroid estimation scheme based on signal intensity.

When the number (e.g., three or more) of effective eNBs is insufficient, the electronic device may determine the number of the effective eNBs based on an adjacent eNB history. Here, the adjacent eNB history includes information in a detected adjacent eNBs previously. For example, if the number of a detected adjacent eNB for a current location is one, the electronic device may identify the number of a detected adjacent eNB for a previous location from the adjacent eNB history. If the number of the detected adjacent eNB for the previous location is two or more, the electronic device may determine the number of the effective eNBs including the detected adjacent eNB of the current location and at least two detected adjacent eNB of the previous location.

Figure 14:
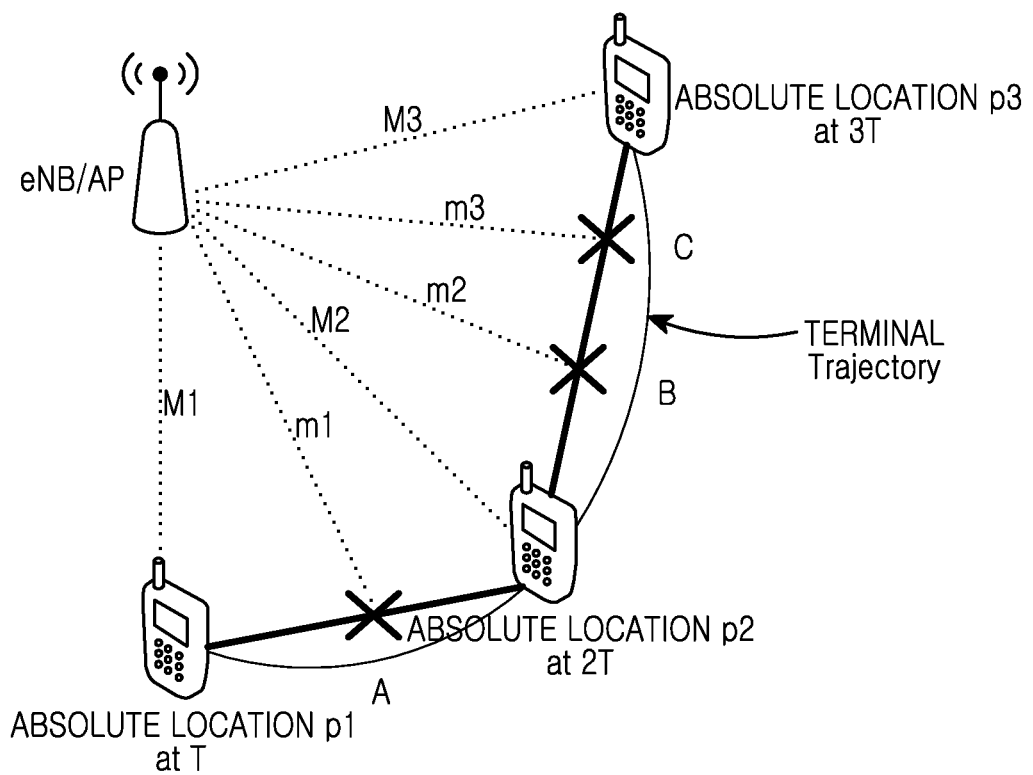
FIG. 14 illustrates an example interpolation method for calculating a location of an eNB or AP according to various embodiments of the present disclosure.
Figure 15:
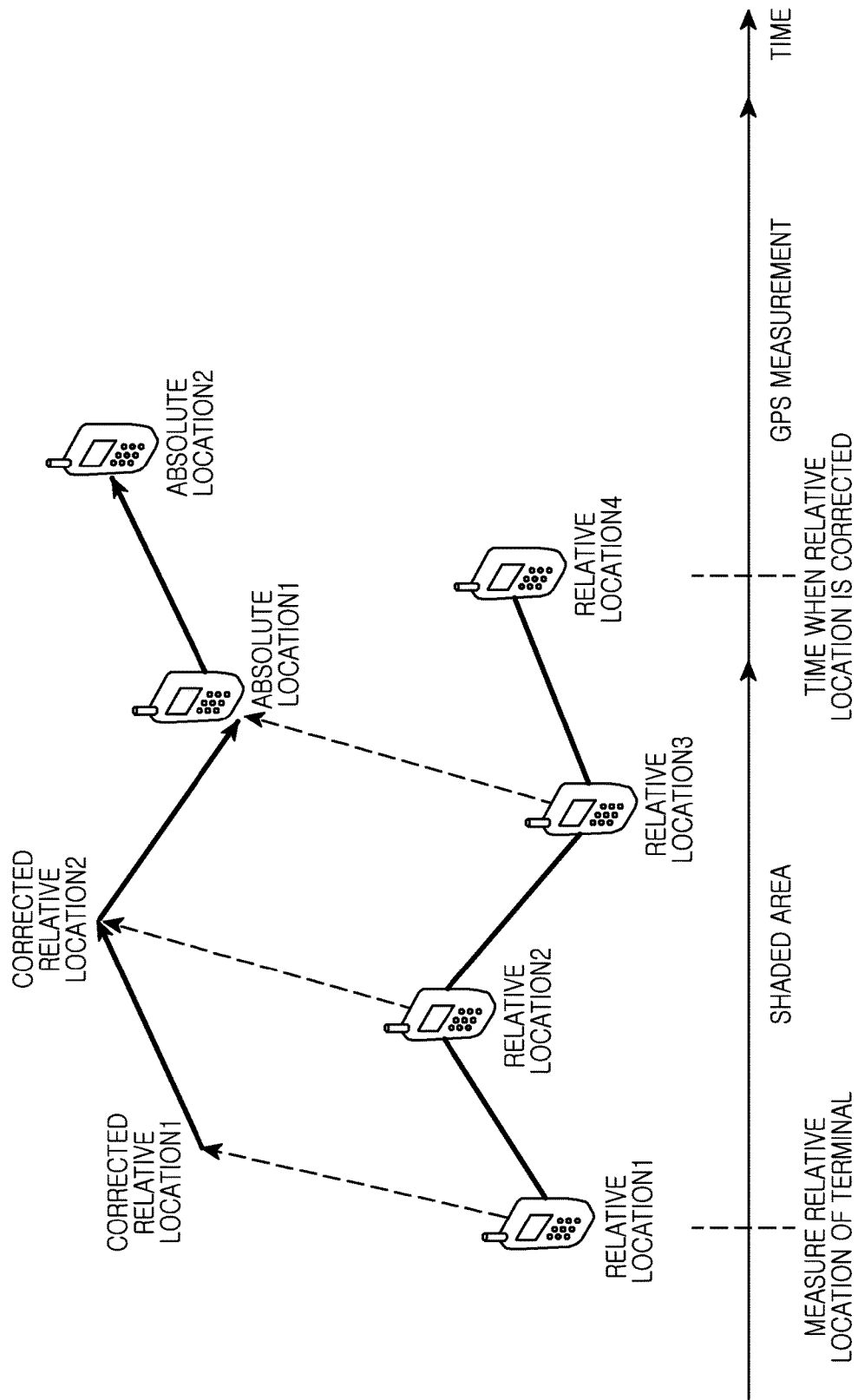
FIG. 15 illustrates an example method of correcting a previous relative location using an absolute location and relative location of an electronic device according to various embodiments of the present disclosure.
Figure 16:
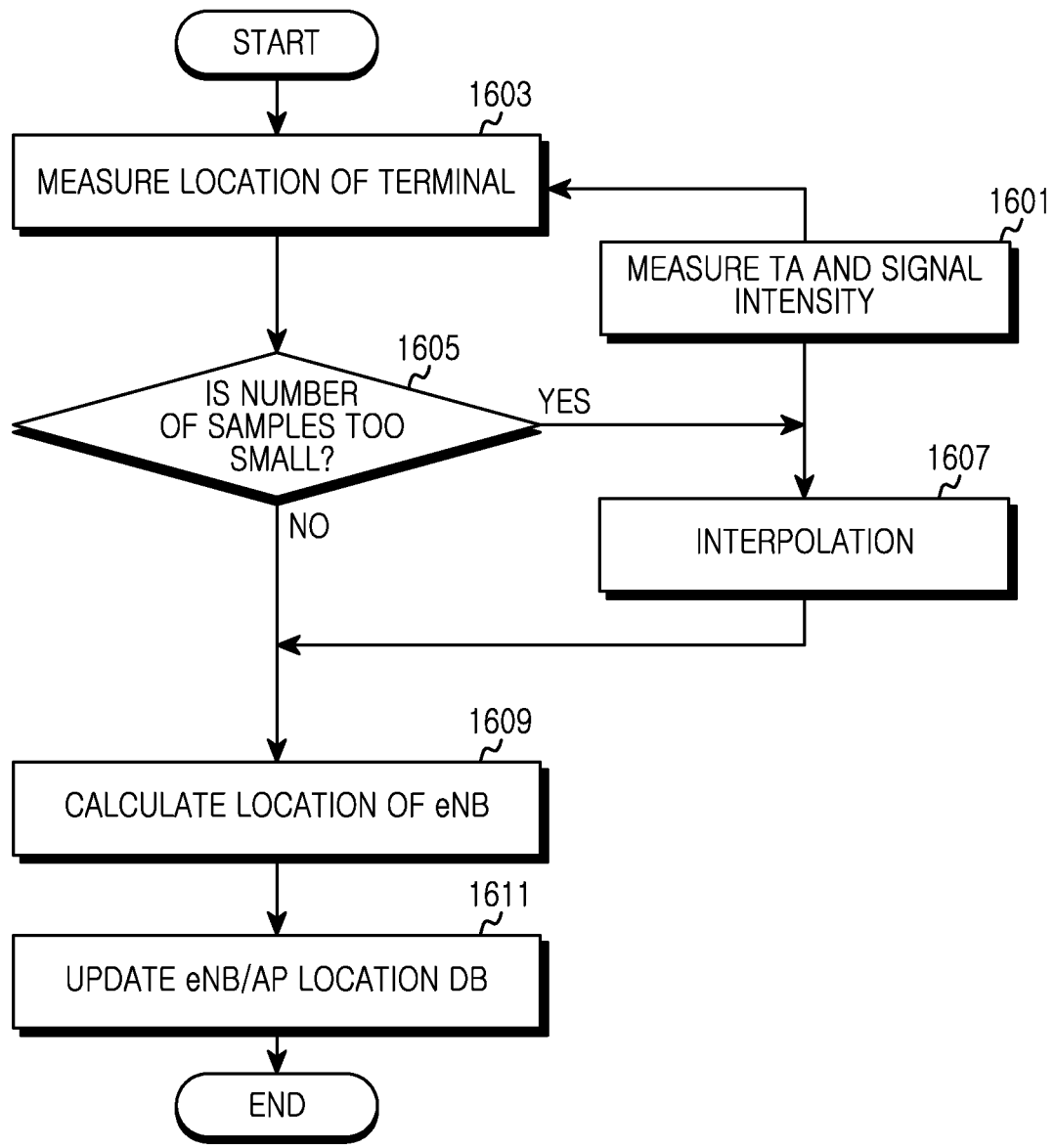
FIG. 16 is a flowchart illustrating an example process for calculating a location of an eNB or AP according to various embodiments of the present disclosure.

When effective adjacent eNBs are not sufficient, the electronic device may perform a process of estimating locations of adjacent cells by itself (e.g., see FIGS. 14 to 16).

Figure 10:
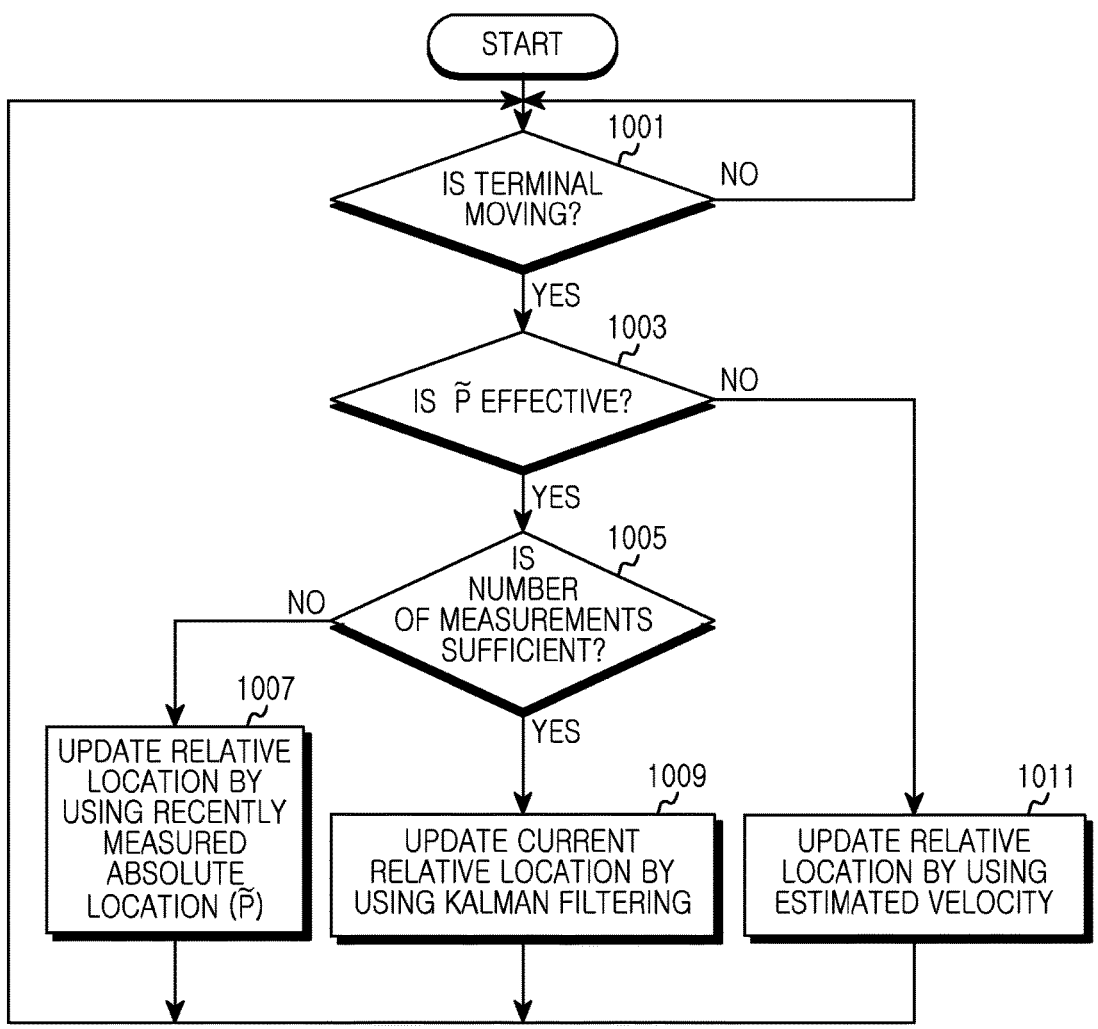
FIG. 10 is a flowchart illustrating an example process for correcting a location of an electronic device according to various embodiments of the present disclosure.

FIG. 10 is a flowchart illustrating an example process for correcting the location of the electronic device according to various embodiments of the present disclosure.

Referring to FIG. 10, the electronic device may determine whether the electronic device is moving by using a Doppler frequency or a sensor in operation 1001. When the electronic device is moving, the electronic device may determine whether an absolute location $\tilde{p}$ of the electronic device is effective in operation 1003. For example, the electronic device may determine whether the absolute location of the electronic device is effective based on a difference between the absolute location and relative location of the electronic device, or may detect whether the absolute location is an effective measurement value through a movement distance comparison using velocity information of the electronic device having relatively high reliability. When $\tilde{p}$ is effective, the electronic device may determine whether the number of location measurements is sufficient in operation 1005. In other words, the electronic device may determine whether the number of location measurements is larger than or equal to a threshold in operation 1005.

When the number of location measurements is not sufficient, the electronic device may update the relative location based on the currently measured absolute location $\tilde{p}$ of the electronic device in operation 1007. For example, the electronic device may determine the currently measured absolute location of the electronic device as the relative location.

When the number of location measurements is sufficient, the electronic device may update the relative location of the current electronic device by performing Kalman filtering in operation 1009. For example, the electronic device may determine the current relative location based on a previously estimated relative location by using Kalman filtering.

However, when $\tilde{p}$ is not effective, the electronic device may update the relative location of the electronic device by using velocity information of the electronic device having relatively high reliability in operation 1011. For example, the electronic device may calculate how much the electronic device has moved from a previous location by using the estimated velocity of the electronic device.

Figure 11:
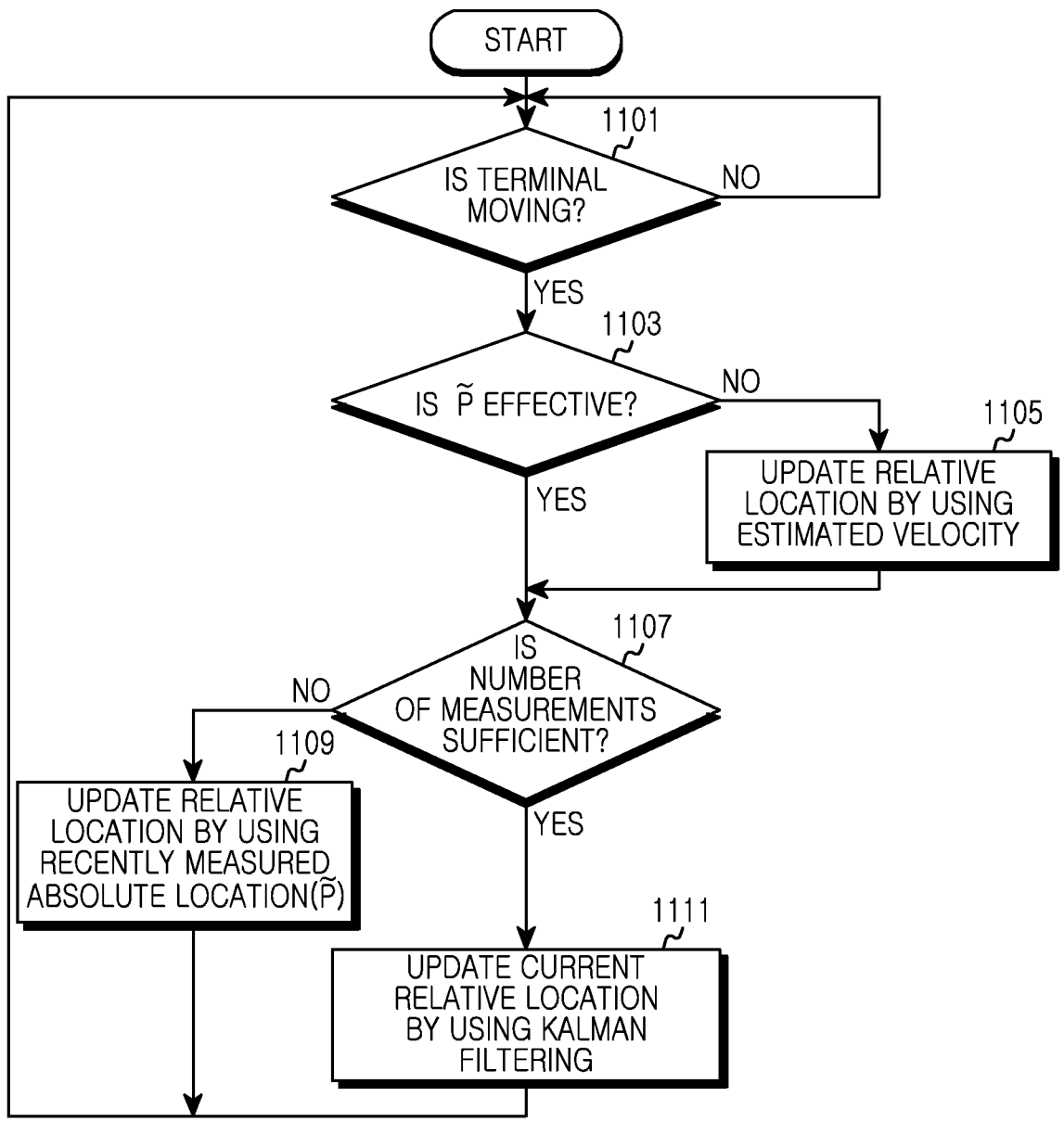
FIG. 11 is a flowchart illustrating an example process for correcting a location of an electronic device according to various embodiments of the present disclosure.

FIG. 11 is a flowchart illustrating a process for correcting the location of the electronic device according to various embodiments of the present disclosure.

Referring to FIG. 11, the electronic device may determine whether the electronic device is moving by using a Doppler frequency or a sensor in operation 1101. When the electronic device is moving, the electronic device may determine whether a recently estimated location $\tilde{p}$ of the electronic device is effective in operation 1103. The electronic device may perform operation 1107 when the location $\tilde{p}$ of the electronic device is effective, and update the relative location of the electronic device by using velocity information of the electronic device having relatively high reliability in operation 1105 when the location $\tilde{p}$ of the electronic device is not effective. For example, the electronic device may calculate how much the electronic device has moved from a previous location by using the estimated velocity of the electronic device.

The electronic device may determine whether the number of location measurements is sufficient in operation 1107. In other words, the electronic device may determine whether the number of location measurements is larger than or equal to a threshold in operation 1107.

When the number of location measurements is not sufficient, the electronic device may update the relative location of the electronic device by using the currently measured absolute location $\tilde{p}$ in operation 1109. For example, the electronic device may determine the currently measured absolute location of the electronic device as the relative location.

When the number of location measurements is enough, the electronic device may update the relative location of the electronic device by performing Kalman filtering in operation 1111. For example, the electronic device may determine the current relative location based on a just previously estimated relative location by using Kalman filtering.

FIGS. 10 and 11 illustrate a method of updating the location of the electronic device in detail by using the following equations.

Equation (2) below shows a velocity vector with respect to x and y axes of the electronic device, and the electronic device may use an input of a sensor module to determine whether the electronic device is moving in order to minimize power consumption of the module which provides velocity information of the electronic device. When the electronic device is not moving, the location calculation is not required, so that the electronic device may calculate the velocity information when the electronic device is moving.

$$\tilde{V} = \begin{pmatrix} \tilde{v}_x \\ \tilde{v}_y \end{pmatrix} \quad (2)$$

In equation (2), $\tilde{v}_x$ denotes a velocity measurement value for an x axis, and $\tilde{v}_y$ denotes a velocity measurement value for a y axis. $\tilde{v}_x$ and $\tilde{v}_y$ may be estimated by combining acceleration, gyroscope, and pedometer sensor, and may be calculated through an averaging process during a predetermined time.

According to various embodiments, when a Doppler frequency is larger than or equal to a predetermined threshold, the electronic device may determine that the electronic device is moving and generate an interrupt. When the interrupt is generated, the electronic device may activate a sensor and detect a change in the sensor values on a predetermined cycle. The change in the sensor values may be output through an averaging process.

When the Doppler frequency is smaller than the threshold, the electronic device may generate another interrupt to deactivate a sensor related to velocity estimation, or discontinue the supply of power to the sensor.

According to various embodiments, when a sensor module related to velocity measurement is not installed or cannot be used, the electronic device may measure a change in the location of the electronic device based on adjacent cell location information and signal intensity, and calculate a heading vector from the current location (e.g., a velocity vector).

In various embodiments, a trilateration scheme based on signal intensity using a cell location has a large error in the location of the terminal according to eNB density, a channel state, and an eNB database error level, so that the electronic device may estimate the velocity vector of equation (2) by using a Doppler frequency or sensor information for velocity information and using a heading vector for direction information. The heading vector may be measured based on Reference Signal Time Difference (RSTD) and a weighted centroid. According to various embodiments, when a shadowing influence is not large, the electronic device may use a location change heading vector based on signal intensity. When signal intensities of two or more adjacent eNBs are not detected, the electronic device may give the same weighting. Further, when there is no location information of adjacent eNBs, the electronic device may user a method of determining locations of eNBs described below.

Equation (3) below shows a vector including update information of a location (m) and a velocity (m/s) of the electronic device. Alternatively, when longitude/latitude is used, m and m/s may be replaced with degree and degree/s. A location/velocity vector may be updated on a T(s) cycle.

A cycle on which the location of the electronic device is updated may be differently applied according to each of measurement cycles of one or more location measurement methods.

$$s = (\bar{x}, \bar{y}, \tilde{v}_x, \tilde{v}_y)^T \quad (3)$$

In equation (3), $\bar{x}$ and $\bar{y}$ may denote current location values of x and y axes of the electronic device. According to various embodiments of the present disclosure, a coordinate value may correspond to longitude and latitude, and velocity $\tilde{v}_x$ and $\tilde{v}_y$ may be calculated using longitude/latitude and a measurement cycle.

According to various embodiments of the present disclosure, in a case of a movement state of the electronic device, three methods below may be used for updating the location of the electronic device.

First, when there are no electronic device location measurements and sensor corrections, movement of the electronic device may be updated using velocity information within the vector based on equation (4). At this time, velocity information updated by terminal location measurement having low accuracy rather than velocity sensor correction may have a large location error. The velocity information by the location measurement having low accuracy may operate within a range of $[\tilde{\sigma}_v, -\tilde{\sigma}_v]$ described below.

$$s \leftarrow As \quad (4)$$

In equation (4), matrix A may be defined below.

$$A = \begin{pmatrix} 1 & 0 & T & 0 \\ 0 & 1 & 0 & T \\ 0 & 0 & 1 & 0 \\ 0 & 0 & 0 & 1 \end{pmatrix}$$

When the velocity and direction information of the electronic device is updated, the electronic device may update a velocity vector by using equation (5) below a then perform equation (5).

$$\begin{pmatrix} s(3) \\ s(4) \end{pmatrix} \leftarrow (1-\beta) \begin{pmatrix} s(3) \\ s(4) \end{pmatrix} + \beta \begin{pmatrix} \tilde{v}_x \\ \tilde{v}_y \end{pmatrix} \quad (5)$$

In equation (5), s(x) denotes an xth element of vector s. β denotes a degree of the reflection of the velocity updated from the sensor. β=1 means 100% reflection, is and β=0 means no reflection, which is defined in equation (3). When β is closer to 1, it means that sensor information is more accurate information than the current updated velocity. When a cycle on which the absolute location of the terminal is longer and an error level is higher, it is preferable to set β to be larger.

Thirdly, the absolute location of the electronic device applying Kalman filtering may be updated using equation (6). A location measurement value is adaptively reflected according to a measurement error level and a terminal velocity. The application of a Kalman gain (K) to a difference of an additionally measured location vector may be reflected in equation (4) above.

$$s \leftarrow As + K(\tilde{p} - HAs) \quad (6)$$

In equation (6), $$H = \begin{pmatrix} 1 & 0 & 0 & 0 \\ 0 & 1 & 0 & 0 \end{pmatrix}, \text{ and } \tilde{p} = \begin{pmatrix} \tilde{x} \\ \tilde{y} \end{pmatrix}$$

corresponds to a currently updated location value of the electronic device and may include a location measurement error. For example, the GPS may have an error level within 10 m, and the NLP may have an error level from 50 to 1000 m according to WiFi/Cellular. Since the error level varies depending on indoor/outdoor, adjacent WiFi, and eNB distribution, the electronic device may utilize a method of determining an error level of measured location information.

For calculation of the Kalman gain of equation (6), a covariance matrix of equation (7) below is calculated. At this time, velocity information of the electronic device is needed. When the velocity information cannot be acquired from the sensor, it is preferable to use the velocity information within the vector of equation (3). However, when a location/velocity vector updated cycle is relatively long based on the movement of the electronic device and thus reliability is low, the electronic device may estimate a high velocity to increase a weighting of $\tilde{p}$ and may estimate a low velocity to decrease a weighting of $\tilde{p}$.

$$C \leftarrow ACA^T + \tilde{\sigma}_v^2 LL^T \quad (7)$$

In equation (7), $$L = \begin{pmatrix} 0 & 0 & T & 0 \\ 0 & 0 & 0 & T \end{pmatrix}^T.$$

Based on equation (7) above, a Kalman gain may be calculated in equation (8). The Kalman gain include an error level $\tilde{\sigma}_\epsilon$.

$$K \leftarrow CH^T(HCH^T + \tilde{\sigma}_\epsilon^2 I_2)^{-1} \quad (8)$$

In an initial update, it is preferable to use an initial value of a covariance matrix of equation (9). The covariance matrix may include a corresponding location error level.

$$C_0 = \begin{pmatrix} \tilde{\sigma}_\epsilon^2 & 0 & 0 & 0 \\ 0 & \tilde{\sigma}_\epsilon^2 & 0 & 0 \\ 0 & 0 & \tilde{\sigma}_v^2 & 0 \\ 0 & 0 & 0 & \tilde{\sigma}_v^2 \end{pmatrix} \quad (9)$$

Like in equations (8) and (9) above, the location measurement error value may be influenced by a location measurement method, indoor/outdoor, and adjacent eNB density. The electronic device may calculate a measurement error level of a location measurement algorithm applied using an already known location information, or may use a generally known error statistical value of the algorithm. Further, when the velocity information provided from the sensor is relatively accurate, an error level of a measurement algorithm may be estimated, like equation (10) below, by using an error with the currently measured location of the electronic device in equation (3).

$$\tilde{\sigma}_\epsilon \leftarrow E[\|\tilde{p} - HAs\|] \quad (10)$$

In equation (10), E[x] denotes an averaging process of x. $\|x\|$ denotes a norm value of vector x.

At this time, $\tilde{\sigma}_\epsilon$ may be replaced with a speed value calculated using the velocity information provided from the sensor or using the Doppler frequency provided from cellular for a low energy operation. When the measured error level is larger than or equal to a preset threshold, the measurement value may be ignored. The velocity information of x and y axes from the sensor may be used by applying a weighting η (0~1) to equation (11).

$$\tilde{\sigma}_v = \eta \|\tilde{v}\| \text{ or } \tilde{\sigma}_v = \frac{E\|As - s\|}{T} \quad (11)$$

In equation (11), since the terminal does not have a uniform motion of straight line, η (for example, 0.7) may be applied.

Based on equation (10) above, location information accuracy/reliability (0~1) may be calculated as defined in equation (12).

$$\text{accuracy probability} = \min\left(\frac{\sigma_{target}^2}{E[\|\tilde{p} - HAs\|^2]}, 1\right) \quad (12)$$

In equation (12), $\sigma_{target}$ denotes a location measurement error acceptable level of the electronic device. For example, the GPS may have accuracy within 10 m which is optimally provided from the electronic device.

Equation (12) below may define a ratio between a movement distance by the location measurement value in the current location of the electronic device in equation (3) and a movement distance using a terminal velocity. When the velocity information is relatively accurate, an increase/decrease in an error of the location measurement algorithm may be determined.

In order to determine whether the calculated location information is effective, equation (13) below may be used.

$$\gamma = \|\tilde{p} - HAs\| \quad (13)$$

In equation (13), γ denotes an error level with a measurement value for a get change in the relative location. As $\sigma_{target}$ is larger, the error with the measurement value becomes larger. When the measurement of the terminal velocity through the sensor or the heading vector is accurate, $\tilde{p}$ has a larger error as γ becomes larger, and $\tilde{p}$ has higher accuracy as γ becomes smaller.

For example, when there is no Line of Sight (LOS), for example indoors or in a shaded area, even a GPS having a small measurement error calculates a wrong time offset and thus results in a wrong terminal location. Accordingly, the electronic device may determine reliability of the value measured using equation (13) or equation (10) corresponding to the average value to determine whether the value is an effective $\tilde{p}$.

Based on K calculated from equation (8) above, the covariance matrix may be updated using equation (14).

$$C \leftarrow C - KHC \quad (14)$$

When the relative location of the terminal is estimated using a velocity sensor, the absolute location of the terminal is to be corrected after a predetermined time passes in order to correct a relative location error. At this time, movement of the terminal is periodically identified. The relative location and the absolute location of the terminal may be updated when the terminal moves.

When a movement identification cycle is T, a movement distance of the terminal is m. When the movement distance is periodically identified every predetermined time, the movement of the terminal may be identified in inverse proportion to the velocity through the Doppler frequency of the terminal as described in equation (15).

$$T \propto \frac{1}{\bar{\sigma}_v} \quad (15)$$

According to various embodiments, when the terminal has moved from a previous location by a predetermined distance based on a terminal location update value, the movement of the terminal may be determined.

Figure 12:
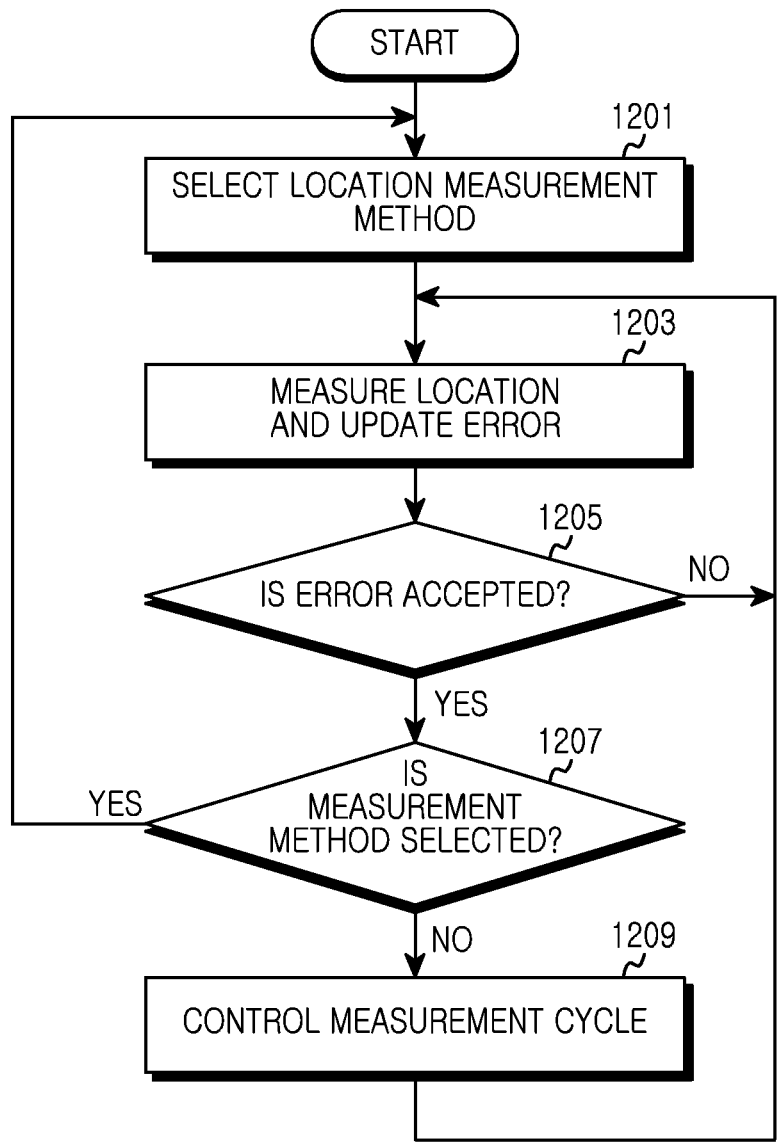
FIG. 12 is a flowchart illustrating an example process for selecting a location measurement method based on an error acceptance according to various embodiments of the present disclosure.

FIG. 12 is a flowchart illustrating an example process for selecting a location measurement method based on an error acceptance according to various embodiments of the present disclosure.

Referring to FIG. 12, the electronic device may select one of a plurality of location measurement methods in operation 1201. For example, a location estimation scheme may be one of a location estimation scheme using trilateration based on signal intensity, or RSTD and a weighted centroid location estimation scheme.

The electronic device may measure the location of the electronic device based on the selected location estimation and update a location measurement error in operation 1203.

The electronic device may determine whether the location measurement error is accepted in operation 1205. For example, the electronic device may determine whether the location measurement error is accepted based on the accuracy and reliability of location measurement defined in equation (11).

When the location measurement error is acceptable, the electronic device may repeatedly perform operation 1203. When the location measurement error is not acceptable, the electronic device may perform operation 1207.

When the electronic device determines whether to select another location measurement method and another location measurement method is thus selected in operation 1207, the electronic device may reperform operation 1201. When the electronic device does not select another location measurement method, the electronic device may control a location measurement cycle in operation 1209. For example, the electronic device may reduce the location measurement error by making the location measurement cycle shorter.

According to various embodiment, the cycle of the location measurement method may be configured in consideration of current consumption used for each measurement method. For example, a cycle of the relative location update method having small current consumption may be configured as 5 seconds, a cycle of the trilateration having large current consumption may be configured as 10 seconds, and a cycle of the GPS method having largest current consumption may be configured as 60 seconds. In another embodiment, the cycle of the location measurement method may be configured in consideration of accuracy of each method. When an error is not satisfied (e.g., corrected or reduced) based on the accuracy, a measurement cycle of each location measurement method may be reduced. Further, when the error is satisfied, the measurement cycle of each location measurement method may gradually increase. A dynamic control of the measurement cycle may be performed in inverse proportion to the movement velocity of the terminal as well as the error.

Figure 13:
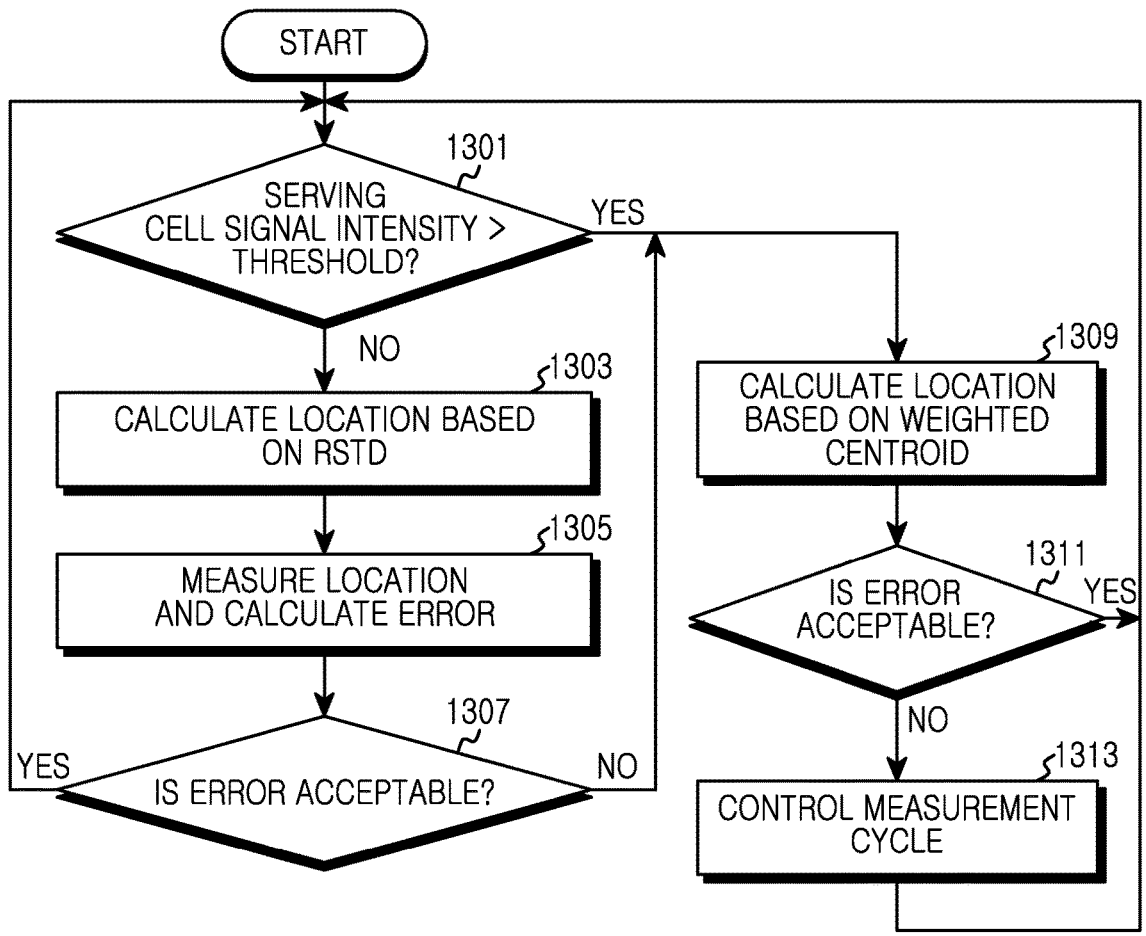
FIG. 13 is a flowchart illustrating an example process for selecting a location measurement method based on an error acceptance according to various embodiments of the present disclosure.

FIG. 13 is a flowchart illustrating an example process for selecting a location measurement method based on an error acceptance according to various embodiments of the present disclosure.

Referring to FIG. 13, the electronic device may determine whether signal intensity of a serving cell is larger than a threshold in operation 1301. That is, the electronic device may determine whether the electronic device is located close to a serving eNB in operation 1301.

When the signal intensity of the serving cell is not larger than the threshold (for example, when the electronic device is spaced apart or distanced from the serving eNB as indicated by the threshold or more), the electronic device may calculate the location based on RSTD in operation 1303. For example, the electronic device may calculate distances from three effective eNBs and then calculate the location of the electronic device through trilateration, and may determine a location measurement error of the calculated location of the electronic device in operation 1305.

The electronic device may determine whether the location measurement error is acceptable in operation 1307. For example, the electronic device may determine whether the location measurement error is acceptable based on accuracy and reliability of location measurement defined in equation (11).

When the location measurement error is acceptable, the electronic device may reperform operation 1301. When the location measurement error is not acceptable, the electronic device may perform operation 1309. In other various embodiments, when the location measurement error is not acceptable, the electronic device may control a location measurement cycle in operation 1313.

When the error is not acceptable in operation 1307, or when the signal intensity of the serving cell is larger than the threshold (for example, when the electronic device is close to the serving eNB) in operation 1301, the location of the electronic device may be calculated based on a weighted centroid location estimation scheme in operation 1309. The weighted centroid location estimation scheme applies weightings to locations of adjacent eNBs in inverse proportion to signal intensity and distances between the adjacent eNBs and the electronic device, and calculates an average value of the locations of the adjacent eNBs to which the weightings are applied.

The electronic device may determine whether a measurement error of the location calculated by the weighted centroid location estimation scheme is acceptable in operation 1311.

When the location measurement error is acceptable, the electronic device repeatedly performs operations 1301, 1309, and 1311. When the location measurement error is not acceptable, the electronic device may control a location measurement cycle in operation 1313. For example, the location measurement error may be accepted by controlling the location measurement cycle. When the location measurement error is acceptable in operation 1311, the electronic device may reperform operation 1301. For example, the electronic device uses equation (13) in order to determine whether the calculated location information is effective.

FIG. 14 illustrates an example interpolation method for calculating a location of an eNB or AP according to various embodiments of the present disclosure.

Referring to FIG. 14, when an electronic device cannot receive location information of an adjacent eNB from a server, the electronic device may acquire information on distances between one or more absolute locations of the electronic device and the eNB and then estimate the location of the eNB based on trilateration. At this time, distance information M1, M2, and M3 between the electronic devices and the eNB may be determined using Timing Advance (TA) information in a case of signal intensity or a serving cell.

When a cycle on which the electronic device acquires the distance information from the corresponding eNB is long, the electronic device may correct and store distances m1, m2, and m3 between additional electronic devices and the eNB. For example, the electronic device may estimate the distance m1 between the electronic device in location A and the eNB by interpolating signal intensity or TA information in absolute locations p1 and p2 of the electronic device. Similarly, the electronic device may estimate the distances m2 and m3 between the electronic device in locations B and C and the eNB by interpolating signal intensity or TA information in absolute locations p2 and p3 of the electronic device.

In various embodiments, the absolute locations A, B, and C of the electronic device may have a weighted average value using previous and next locations p1-p2 and p2-p3 of the electronic device. The calculation of the location of the eNB based on trilateration utilizes locations of three or more effective electronic devices and information on distances between the electronic device in absolute locations and the eNB. Table 1 below shows an example of interpolation to acquire additional locations of the electronic device in 2T, 4T, and 5T in order to calculate the location of eNB #1 when the number of absolute locations of effective electronic devices is insufficient. When the sensor can be used, a process of updating a relative location between absolute location values according to the present disclosure to increase accuracy of the location of the electronic device may be included.

TABLE 1

|  | Time | | | | | |
| --- | --- | --- | --- | --- | --- | --- |
|  | T | 2T | 3T | 4T | 5T | 6T |
| Location coordinate | P1 | — | P2 | — | — | P3 |
| Interpolation | — | (P1 + P2)/2 | — | ⅔ * P2 + ⅓ * P3 | ⅓ * P2 + ⅔ * P3 | — |
| eNB#1 | M11 | m11 | M12 | m12 | m13 | M13 |
| eNB#2 | M21 | — | M22 | — | — | — |
| eNB#3 | M31 | — | — | — | — | M33 |

In order to reduce errors in a cell location result and an absolute location value of the electronic device, the process may be repeatedly equalized.

FIG. 15 illustrates an example method of correcting a previous relative location using an absolute location and relative location of the electronic device according to various embodiments of the present disclosure.

Referring to FIG. 15, when the electronic device performs a location estimation method, if an absolute location value of the terminal cannot be measured because the terminal is in a shaded area, such as the basement where reception is poor, the electronic device may update the relative location by using a sensor (e.g., herein, equations 10 to 13 may be used to determine whether a measurement value is effective). When the absolute location values can be measured, relatively updated relative location trace information may be corrected as shown in Table 2. At this time, for the location correction, "eta" values from 0 to 1 may be applied. For example, the electronic device may correct relative location 1 and relative location 2 based on absolute location 1.

TABLE 2

| Time | T | 2T | 3T | 4T | 5T |
| --- | --- | --- | --- | --- | --- |
| Location coordinate | — | — | — | — | P2 |
| Sensor-based location update value | — | R1 | R2 | R3 | R4 |
| Location correction value | eta*(P2 − R4) | R1 + eta*(P2 − R4) | R2 + eta*(P2 − R4) | R3 + eta*(P2 − R4) | P2 |
| eNB#1 | M11 | m11 | m12 | m13 | M12 |
| eNB#2 | — | m21 | m22 | m23 | M21 |

In various embodiments of the present disclosure, a user may register and search for a Point of Interest (POI) within the basement and shaded area within a building. When the electronic device cannot acquire an absolute location value including a GPS when the user registers the POI, the electronic device may designate a predetermined reference location and acquire a relative location of the electronic device from the reference location. When the time in which the electronic device can perform the measurement through the GPS arrives, the electronic device may correct a previous relative location trace as shown in Table 2. At this time, the electronic device may effectively register/search for the POI within the building by using a barometer as well as an acceleration/gyro sensor. For example, the electronic device may determine the number of stories by using a barometer and register the PIO with corresponding information. Further, information on a corresponding story may be used for searching for the corresponding POI. In one embodiment, the electronic device may determine the number of stores of the registered POI by comparing barometer information acquired when the POI is registered and barometer information acquired in a state where the absolute location can be measured. When the registered POI is searched for, the electronic device may more effectively search for the POI by managing a limited relative location trace in a corresponding story by using the story information. The barometer may be operated during a process for registering and searching for a POI in a shaded area where the absolute location cannot be measured.

FIG. 16 is an example flowchart illustrating a process for calculating the location of the eNB or AP according to various embodiments of the present disclosure.

Referring to FIG. 16, the electronic device may measure eNB TA or signal intensity in operation 1601.

The electronic device may measure a location of the electronic device by using the signal intensity or TA information of the eNB in operation 1603.

The electronic device may determine whether the number of samples corresponding to locations of the electronic device is too small in operation 1605. For example, the number of samples is smaller than a threshold, the electronic device determines that the number of samples is too small. For example, the threshold is 3. When the number of samples is sufficiently large, the electronic device may perform operation 1609. When the number of samples is too small, the electronic device may perform interpolation by using the eNB TA or signal intensity in two samples in operation 1607 to determine eNB signal intensity or TA information between the two samples.

The electronic device may calculate a location of the eNB by using sufficient absolute location information of the electronic device in operation 1609, and update the location of the eNB by using the calculated location information of the eNB in operation 1611.

According to various embodiments, when a movement distance of the electronic device is updated into a predetermined distance or more while the relative location is updated through a velocity vector, an additional absolute location may be measured. For example, an error may be reduced by using a GPS at a predetermined interval based on a weighted centroid scheme and a trilateration scheme having a relative large error. The trilateration scheme may utilize three or more eNBs and calculate the location when a separation distance between cells is somewhat secured. When the number of cells is three or less, when a separation distance is in sufficient (e.g., less than 30 m), or when signal intensity of a serving cell is relatively high, the location of the terminal may be calculated through weighted centroid.

Figure 17:
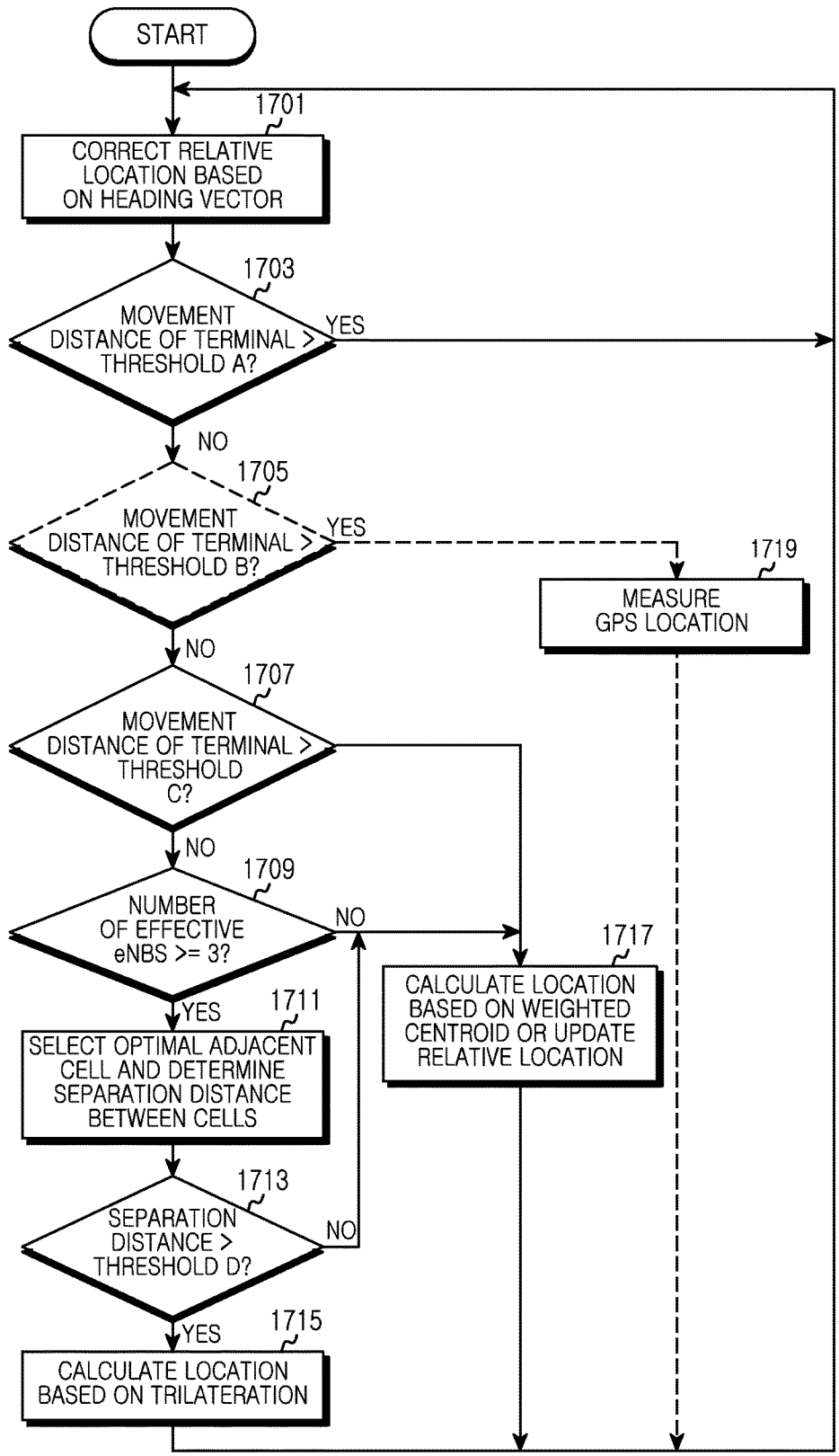
FIG. 17 illustrates an example method of selecting a relative location and absolute location measurement algorithm according to various embodiments of the present disclosure.

FIG. 17 illustrates an example method of selecting a relative location and absolute location measurement algorithm according to various embodiments of the present disclosure.

Referring to FIG. 17, the electronic device may correct a relative location based on a heading vector in operation 1701. For example, the electronic device may determine a movement velocity of the electronic device through the heading vector and correct the relative location based on the movement speed of the electronic device, as shown in FIG. 15.

The electronic device may perform operation 1701 when the movement distance of the electronic device is not larger than threshold A in operation 1703, and may determine whether the movement distance of the electronic device is larger than threshold B in operation 1705, when the movement distance of the electronic device is larger than threshold A.

The electronic device may perform operation 1707 when the movement distance of the electronic device is not larger than threshold B in operation 1705, and measure the location by using the GPS in operation 1719 when the movement distance of the electronic device is larger than threshold B. Then, the electronic device may repeatedly perform operation 1701.

For example, the electronic device may correct the relative location based on the heading vector until the movement distance corresponds to threshold A. Thereafter, when the electronic device reaches the movement distance corresponding to threshold B, the electronic device may determine the absolute location of the electronic device by measuring the location through GPS. The electronic device may determine whether signal intensity of the serving cell is larger than threshold C in operation 1707. When the signal intensity of the serving cell is larger than threshold C, the electronic device may calculate a weighted centroid based location in operation 1717.

When the signal intensity of the serving cell is smaller than threshold C, the electronic device determines whether the number of effective eNBs is larger than or equal to three in operation 1709. When the number of effective eNBs is smaller than three, the electronic device may calculate the weighted centroid based location or update the relative location through the velocity in operation 1717.

When the number of effective eNBs is larger than or equal to three, the electronic device may select an optimal adjacent cell and determine a separation distance between cells.

The electronic device determines whether a separation distance between adjacent cells is larger than threshold D in operation 1713. When the separation distance between adjacent cells is smaller than threshold D, the electronic device may calculate the weighted centroid based location in operation 1717. Then, the electronic device may repeatedly perform operation 1701.

When the separation distance between adjacent cells is larger than threshold D, the electronic device may calculate the location based on trilateration in operation 1715. Then, the electronic device may repeatedly perform operation 1701.

Figure 18:
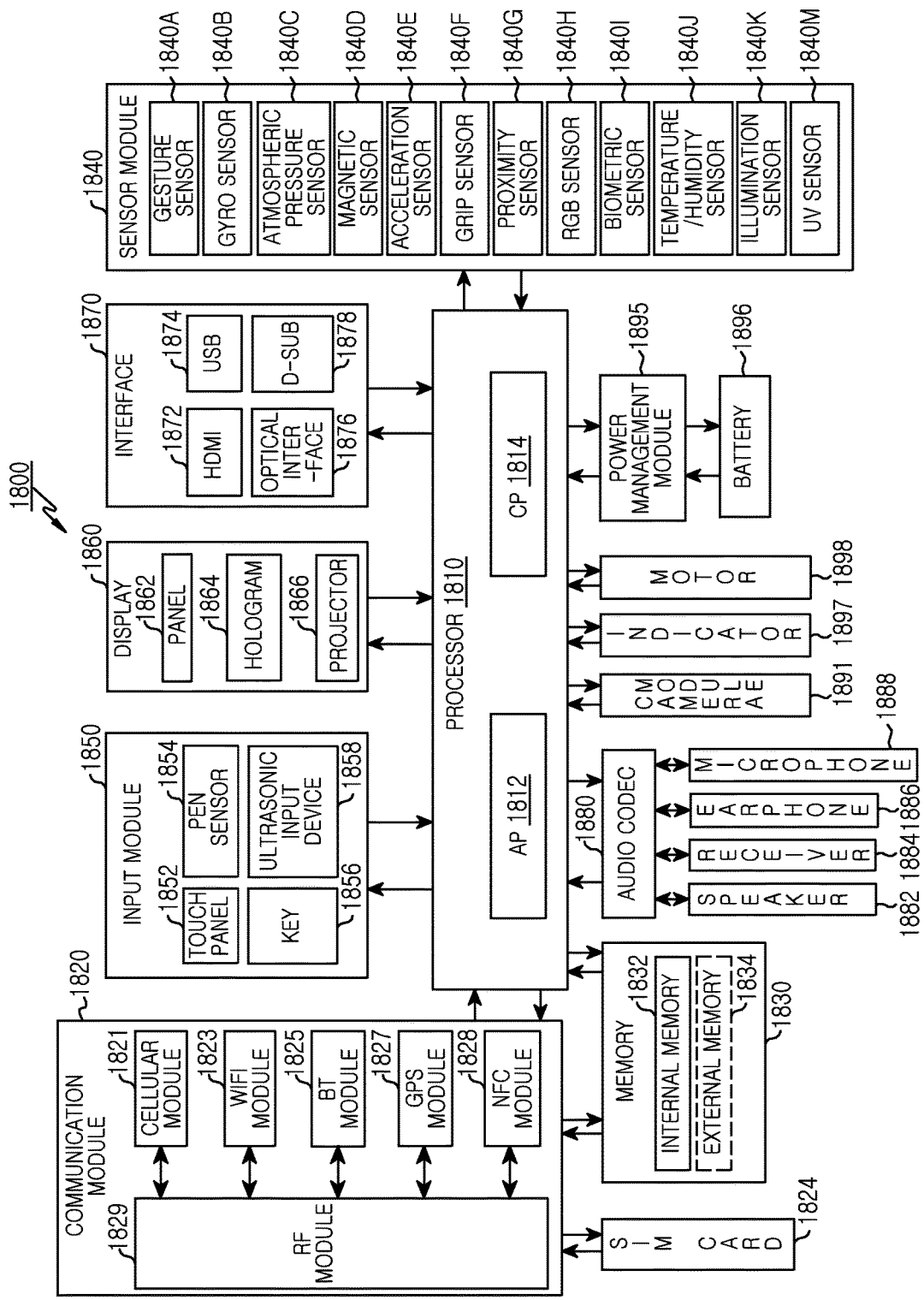
FIG. 18 is a block diagram of an example electronic device according to various embodiments of the present disclosure.

FIG. 18 is a block diagram of the electronic device according to various embodiments. The electronic device 1800 may include, for example, all or some of the electronic device 101 illustrated in FIG. 1. Referring to FIG. 18, the electronic device 1800 may include one or more processors 1810, a Subscriber Identification Module (SIM) card 1824, a memory 1830, a communication module 1820, a sensor module 1840, an input module 1850, a display 1860, an interface 1870, an audio module 1880, a camera module 1891, a power management module 1895, a battery 1896, an indicator 1897, and/or a motor 1898.

The processor 1810 (for example, the processor 120) may include one or more Application Processors (APs) 1812 or one or more Communication Processors (CPs) 1814. Although FIG. 18 illustrates that the AP 1812 and the CP 1814 are included in the processor 1810, the AP 1812 and the CP 1814 may be included in different "IC" packages, respectively. According to one embodiment, the AP 1812 and the CP 1814 may be included in one IC package.

The AP 1812 may control a plurality of hardware or software components connected to the AP 1812 by driving an operating system or an application program and perform processing of various pieces of data including multimedia data and calculations. The AP 1812 may be implemented by, for example, a System on Chip (SoC). According to one embodiment, the processor 1810 may further include a Graphic Processing Unit (GPU).

The CP 1814 may perform a function of managing a data link and changing a protocol in communication between the electronic device 1800 (for example, the electronic device 101) and other electronic devices (for example, the electronic device 102, the electronic device 104, or the server 106) connected to the electronic device 1800 through the network. The CP 1814 may be implemented by, for example, an SoC. According to one embodiment, the CP 1814 may perform at least some of multimedia control functions. The CP 1814 may distinguish between and authenticate electronic devices within a communication network by using a subscriber identification module (for example, the SIM card 1824). Furthermore, the CP 1814 may provide a user with services, such as a voice call, a video call, a text message, packet data, or the like.

In addition, the CP 1814 may control data transmission/reception of the communication module 1820. In FIG. 18, the components such as the CP 1814, the power management module 1895, the memory 1830, and the like are illustrated as components separated from the AP 1812. However, according to one embodiment of the present disclosure, the AP 1812 may include at least some (for example, the CP 1814) of the above-described components.

According to one embodiment, the AP 1812 or the CP 1814 may load a command or data received from at least one of a non-volatile memory or other components connected to each of the AP 1812 and the CP 1814 to a volatile memory and process the loaded command or data. Further, the AP 1812 or the CP 1814 may store data received from at least one of other components or generated by at least one of other components in a non-volatile memory.

The SIM card 1824 may be a card including a subscriber identification module, and may be inserted into a slot formed in a particular portion of the electronic device. The SIM card 1824 may include unique identification information (for example, an Integrated Circuit Card IDentifier (ICCID)) or subscriber information (for example, an International Mobile Subscriber IDentity (IMSI)).

The memory 1830 (for example, the memory 130) may include an internal memory 1832 or an external memory 1834. The internal memory 1832 may include, for example, at least one of a volatile memory (for example, a Dynamic RAM (DRAM), a Static RAM (SRAM), and a Synchronous Dynamic RAM (SDRAM)), or a non-volatile Memory (for example, a One Time Programmable ROM (OTPROM), a Programmable ROM (PROM), an Erasable and Programmable ROM (EPROM), an Electrically Erasable and Programmable ROM (EEPROM), a mask ROM, a flash ROM, a NAND flash memory, and an NOR flash memory). According to one embodiment, the internal memory 1822 may be a Solid State Drive (SSD). The external memory 1834 may further include a flash drive, for example, a Compact Flash (CF), a Secure Digital (SD), a Micro Secure Digital (Micro-SD), a Mini Secure Digital (Mini-SD), an extreme Digital (xD), a memory stick, or the like. The external memory 1834 may be functionally connected with the electronic device 1800 through various interfaces. According to one embodiment, the electronic device 1800 may further include a storage device (or a storage medium), such as a hard drive.

The communication module 1820 (for example, the communication interface 160) may include a wireless communication module or an RF module 1829. The wireless communication module may include, for example, Cellular 1821, Wi-Fi 1823, Bluetooth (BT) 1825, Global Positioning System (GPS) 1827, or Near Field Communication (NFC) 1828. For example, the wireless communication module may provide a wireless communication function by using a radio frequency. Additionally or alternatively, the wireless communication module may include a network interface (for example, a LAN card), a modem, or the like for connecting the electronic device 1800 to a network (for example, Internet, a Local Area Network (LAN), a Wide Area Network (WAN), a telecommunication network, a cellular network, a satellite network, or a Plain Old Telephone Service (POTS).).

The RF module 1829 may transmit/receive data, for example, an RF signal. Although not illustrated, the RF module 1829 may include, for example, a transceiver, a Power Amp Module (PAM), a frequency filter, a Low Noise Amplifier (LNA), or the like. Further, the RF module 1829 may further include a component for transmitting/receiving an electromagnetic wave in the air in radio communication, such as a conductor or a conducting wire.

The sensor module 1840 may measure a physical quantity or detect an operation state of the electronic device 1800, and may convert the measured or detected information to an electrical signal. The sensor module 1840 may include, for example, at least one of a gesture sensor 1840A, a gyro sensor 1840B, an atmospheric pressure sensor 1840C, a magnetic sensor 1840D, an acceleration sensor 1840E, a grip sensor 1840F, a proximity sensor 1840G, a color sensor 1840H (for example, red, green, and blue (RGB) sensor), a biometric sensor 1840I, a temperature/humidity sensor 1840J, an illumination sensor 1840K, or a Ultra Violet (UV) sensor 1840M. Additionally or alternatively, the sensor module 1840 may include, for example, an E-nose sensor (not illustrated), an electromyography (EMG) sensor (not illustrated), an electroencephalogram (EEG) sensor (not illustrated), an electrocardiogram (ECG) sensor (not illustrated), an Infrared (IR) sensor, an iris sensor (not illustrated), a fingerprint sensor, and the like. The sensor module 1840 may further include a control circuit for controlling one or more sensors included in the sensor module 1840.

The input device 1850 may include a touch panel 1852, a (digital) pen sensor 1854, a key 1856, or an ultrasonic input device 1858. The touch panel 1852 may recognize a touch input by at least one of, for example, a capacitive type, a pressure type, an infrared type, or an ultrasonic type. The touch panel 1852 may further include a control circuit. The capacitive type touch panel may recognize physical contact or proximity. The touch panel 1852 may further include a tactile layer. In this case, the touch panel 1852 may provide a tactile reaction to the user.

The (digital) pen sensor 1854 may be implemented, for example, using a method identical or similar to a method of receiving a touch input of a user, or using a separate recognition sheet. The key 1856 may include, for example, a physical button, an optical key, or a keypad. The ultrasonic input device 1858 is a device capable of identifying data by detecting an acoustic wave with a microphone (for example, a microphone 1888) of the electronic device through an input unit generating an ultrasonic signal, and may perform wireless recognition. According to one embodiment, the electronic device 1800 may receive a user input from an external device (for example, a network, a computer, or a server) connected thereto using the communication module 1820.

The display 1860 (for example, the display 150) may include a panel 1862, a hologram 1864, or a projector 1866. The panel 1862 may be, for example, a Liquid Crystal Display (LCD) or an Active Matrix Organic Light Emitting Diode (AM-OLED). The panel 1862 may be implemented to be, for example, flexible, transparent, or wearable. The panel 1862 may be configured as one module together with the touch panel 1852. The hologram 1864 may show a stereoscopic image in the air by using interference of light. The projector 1866 may project light onto a screen to display an image. The screen may be located, for example, inside or outside the electronic device 1800. According to one embodiment, the display 1860 may further include a control circuit for controlling the panel 1862, the hologram device 1864, or the projector 1866.

The interface 1870 may include, for example, a High-Definition Multimedia Interface (HDMI) 1872, a Universal Serial Bus (USB) 1874, an optical interface 1876, or a D-subminiature (D-sub) 1878. The interface 1870 may be included in, for example, the communication interface 160 illustrated in FIG. 1. Additionally or alternatively, the interface 1870 may include, for example, a Mobile High-definition Link (MHL) interface, a Secure Digital (SD) card/Multi-Media Card (MMC) interface, or an Infrared Data Association (IrDA) standard interface.

The audio codec 1880 may bilaterally convert a sound and an electrical signal. At least some components of the audio codec 1880 may be included in, for example, the input/output interface 140 illustrated in FIG. 1. The audio codec 1880 may process sound information input or output through, for example, a speaker 1882, a receiver 1884, earphones 1886, the microphone 1888 or the like.

The camera module 1891 is a device for capturing a still image or a video, and according to an embodiment, may include one or more image sensors (for example, a front sensor or a rear sensor), a lens (not illustrated), an Image Signal Processor (ISP) (not illustrated), or a flash (not illustrated) (for example, an LED or xenon lamp).

The power management module 1895 may manage the power of the electronic device 1800. Although not illustrated, the power management module 1895 may include, for example, a Power Management Integrated Circuit (PMIC), a charger Integrated Circuit (IC), or a battery or fuel gauge.

The PMIC may be mounted to, for example, an integrated circuit or an SoC semiconductor. The charging methods may be divided into a wired type and a wireless type. The charger IC may charge a battery, and may prevent introduction of over-voltage or over-current from a charger. According to one embodiment, the charger IC may include a charger IC for at least one of the wired charging method or the wireless charging method. A magnetic resonance scheme, a magnetic induction scheme, or an electromagnetic scheme may be exemplified as the wireless charging method, and an additional circuit for wireless charging, such as a coil loop circuit, a resonance circuit, a rectifier circuit, and the like may be added.

The battery gauge may measure, for example, a remaining quantity of the battery 1896, or a voltage, a current, or a temperature during the charging. The battery 1896 may store or generate electricity, and may supply power to the electronic device 1800 using the stored or generated electricity. The battery 1896 may include, for example, a rechargeable battery or a solar battery.

The indicator 1897 may display a specific status of the electronic device 1800 or the part (for example the AP 1812) of electronic device 1800, for example, a booting status, a message status, a charging status, and the like. The motor 1898 may convert an electrical signal to a mechanical vibration. Although not illustrated, the electronic device 1800 may include a processing unit (for example, a GPU) for supporting mobile TV. The processing device for supporting mobile TV may process media data according to standards such as, for example, a digital multimedia broadcasting (DMB), a digital video broadcasting (DVB) or a media flow.

As described above, according to various embodiments of the present disclosure, the location measurement error of the electronic device may be reduced using movement distance and direction information. Further, power consumption may be reduced by effectively providing the location of the electronic device through the use of relative location information of the electronic device, for example, a movement velocity. Moreover, more accurate location information may be provided by reducing a location measurement error of the electronic device. Furthermore, network load related to calculation of the location of the electronic device may be reduced by determining the location within the electronic device.

The above described components of the electronic device according to various embodiments of the present disclosure may be formed of one or more components, and a name of a corresponding component element may be changed based on the type of electronic device. The electronic device according to the present disclosure may be configured by including at least one of the above-described elements, and some of the elements may be omitted, or other elements may be added. Further, some of the elements of the electronic device according to the present disclosure may be combined to be one entity, which can perform the same functions as those of the components before the combination.

The "module" used in various embodiments of the present disclosure may refer to, for example, a "unit" including one of hardware, software, and firmware, or a combination of two or more of the hardware, software, and firmware. The "module" may be interchangeable with a term, such as a unit, a logic, a logical block, a component, or a circuit. The "module" may be the smallest unit of an integrated component or a part thereof. The "module" may be the smallest unit that performs one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least a part of a device (for example, modules or functions thereof) or a method (for example, operations) according to the various embodiments of the present disclosure may be embodied by, for example, a command stored in a computer readable storage medium in a form of a programming module. When he command is executed by one or more processors (for example, the processor 1810), the one or more processors may execute a function corresponding to the command. The computer-readable storage medium may be, for example, the memory 1830. At least a part of the programming module may be implemented (for example, executed) by, for example, the processor 1810. At least a part of the programming module may include, for example, a module, a program, a routine, a set of instructions and/or a process for performing one or more functions.

The computer readable recording medium may include magnetic media such as a hard disc, a floppy disc, and a magnetic tape, optical media such as a compact disc read only memory (CD-ROM) and a digital versatile disc (DVD), magneto-optical media such as a floptical disk, and hardware devices specifically configured to store and execute program commands, such as a read only memory (ROM), a random access memory (RAM), and a flash memory. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

A module or a programming module according to the present disclosure may include at least one of the described component elements, a few of the component elements may be omitted, or additional component elements may be included. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments, a storage medium for storing commands is provided. In order to estimate a location of an electronic device, the commands include: an operation for measuring at least one of a first location and a movement velocity of the electronic device; an operation for determining a second location of the electronic device by using the measured movement velocity of the electronic device; comparing the first location of the electronic device and the second location of the electronic device to determine a location measurement error; and an operation for correcting the measured first location of the electronic device based on the location measurement error.

According to various embodiments, the operation for correcting the measured first location of the electronic device based on the location measurement error may include: when a difference between the first location of the electronic device and the second location of the electronic device is larger than a threshold, an operation for correcting the first location of the electronic device into the second location in consideration of the movement velocity of the electronic device; when the difference between the first location of the electronic device and the second location of the electronic device is smaller than the threshold and when the number of location measurements is smaller than a threshold based on a determination whether the number of location measurements is smaller than the threshold, an operation for determining the first location of the electronic device as a current location of the electronic device; and when the number of location measurements is larger than the threshold based on a determination whether the number of location measurements is larger than the threshold, an operation for updating the location of the electronic device by using Kalman filtering According to various embodiments, Kalman filtering may be performed using the previous second location of the electronic device corrected based on the first location of the electronic device.

According to various embodiments, the operation for measuring the first location of the electronic device may include one of operations for determining the location by using a GPS and determining the location based on location information and signal intensity of an eNB.

According to various embodiments, the operation for determining the location based on the location information and the signal intensity of the eNB may include: when signal intensity of a serving cell is larger than a threshold, an operation for calculating the location based on a weighted centroid estimation scheme; and when the signal intensity of the serving cell is smaller than the threshold, an operation for calculating the location based on trilateration according to the number of effective eNBs.

According to various embodiments, the location may be calculated based on the weighted centroid estimation scheme when the number of effective eNBs is smaller than a threshold, and the location may be calculated based on the weighted centroid estimation scheme when a separation distance between cells is smaller than a threshold.

According to various embodiments, the operation for determining the location by using the GPS may be performed at a predetermined interval together with an operation for determining the location based on the location information and the signal intensity of the eNB.

According to various embodiments, the commands may further include: an operation for acquiring the location information of the eNB from a server; or an operation for estimating the location information of the eNB by using trilateration based on the signal intensity of the eNB measured in at least three locations of the electronic device.

According to various embodiments, the commands may further include an operation for determining whether the location measurement error is acceptable, and controlling a location measurement cycle when the location measurement error is not acceptable.

According to various embodiments, the movement velocity of the electronic device may be determined by a Doppler frequency or a change in the measured location of the electronic device, or determined by a sensor related to movement velocity measurement.

According to various embodiments, a cycle on which the location of the electronic device is updated may be changed in inverse proportion to the movement speed of the electronic device.

According to various embodiments, the operation for measuring at least one of the first location and the movement velocity of the electronic device may be performed when the electronic device is moving after determining whether the electronic device is moving.

According to various embodiments, a method of estimating a location of an electronic device is provided. The method include: an operation for determining whether an absolute location of the electronic device can be estimated based on a first location estimation method; when the absolute location of the electronic device cannot be estimated based on the first location estimation method, an operation for estimating a relative location of the electronic device from a predetermined reference location based on a second location estimation method; and when the absolute location of the electronic device can be estimated based on the first location estimation method, and an operation for correcting the estimated absolute location into the relative location of the electronic device.

According to various embodiments, the operation for determining whether the absolute location of the electronic device can be estimated may be performed when a Point of Interest (POI) registration or search event is generated.

According to various embodiments, the method may further include an operation for setting a corresponding relative location of relative locations of the electronic device corrected based estimated absolute locations as a POI.

According to various embodiments, the method may further include an operation for tracking an altitude of the electronic device by using a barometer, and the number of stories of the POI may be determined by comparing a first altitude in a time when an event for registering or searching for the POI is generated, and a second altitude in a time when the absolute location of the electronic device is estimated.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". In addition, an artisan understands and appreciates that a "processor" or "microprocessor" may be hardware in the claimed disclosure. Under the broadest reasonable interpretation, the appended claims are statutory subject matter in compliance with 35 U.S.C. §101.

Meanwhile, the example embodiments disclosed in the specification and drawings are merely presented to easily describe the technical contents of the present disclosure and help the understanding of the present disclosure and are not intended to limit the present disclosure. Therefore, all changes or modifications derived from the technical idea of the present disclosure as well as the embodiments described herein should be interpreted to belong to the present disclosure.

What is claimed is:

1. A method in an electronic device, comprising:
    detecting a first location of the electronic device based on a first location detecting scheme;
    estimating a second location of the electronic device based on a second location detecting scheme;
    comparing the detected first location and the estimated second location;
    if a difference between the detected first location and the estimated second location is larger than a difference threshold, correcting the detected first location into the estimated second location;
    if the difference between the detected first location and the estimated second location is smaller than the difference threshold, determining whether a number of location measurements is smaller than a location measurements threshold;
    in response to determining that the number of location measurements is smaller than the location measurements threshold, setting the detected first location as a current location of the electronic device; and
    in response to determining that the number of location measurements is not smaller than the location measurements threshold, updating the current location using a filtering scheme,
    wherein the estimating the second location comprises estimating the second location based on a movement velocity of the electronic device, movement direction of the electronic device, and a previously determined location of the electronic device.

2. The method of claim 1, wherein the filtering scheme comprises Kalman filtering executed utilizing the estimated second location as corrected based on the first location.

3. The method of claim 1, wherein detecting the first location comprises detecting the first location based on GPS or detecting the first location based on location information and signal intensity of an eNB.

4. The method of claim 3, wherein the detecting the first location based on the location information and the signal intensity of the eNB comprises:
    if signal intensity of a serving cell is larger than a signal intensity threshold, detecting the first location based on a weighted centroid estimation scheme; and
    if the signal intensity of the serving cell is smaller than the signal intensity threshold, detecting the first location based on trilateration according to a number of effective eNBs.

5. The method of claim 1, wherein detecting the first location comprises:
    detecting the first location based on a weighted centroid estimation scheme when a number of effective eNBs is smaller than an effective eNB threshold; and
    calculating the first location based on the weighted centroid estimation scheme when a separation distance between cells is smaller than a separation distance threshold.

6. The method of claim 3, wherein the movement velocity is determined by one of Doppler frequency, change of a location of the electronic device, or sensing information acquired by a sensor of the electronic device.

7. The method of claim 3, wherein the detection by location information and signal intensity of an eNB comprises at least one of:
    acquiring the location information of the eNB from a server; and
    estimating the location information of the eNB utilizing trilateration based on the signal intensity of the eNB as detected for the electronic device in at least three separate locations.

8. The method of claim 1, further comprising:
    determining whether the difference between the detected first location and the estimated second location is below a target location measurement error level, and
    in response to determining that the difference between the detected first location and the estimated second location is not below the target location measurement error level, controlling a location measurement cycle.

9. The method of claim 1, wherein a cycle on which the first location is updated is altered inverse proportion to the movement velocity.

10. An apparatus for estimating a location of an electronic device, comprising:
    a transceiver; and
    a processor configured to:
        detect a first location based on a first location detecting scheme,
        estimate a second location of the electronic device based on a second location detecting scheme,
        compare the detected first location and the estimated second location,
        if a difference between the detected first location and the estimated second location is larger than a difference threshold, correct the first detected location into the estimated second location considering the detected movement velocity,
        if the difference between the detected first location and the estimated second location is smaller than the difference threshold, determine whether a number of location measurements is smaller than a location measurements threshold,
        in response to determining that the number of location measurements is smaller than the location measurements threshold, set the detected first location as a current location of the electronic device, and
        in response to determining that the number of location measurements is not smaller than the location measurements threshold, update the current location of the electronic device using a filtering scheme,
    wherein the processor is configured to estimate the second location based on a movement velocity of the electronic device, movement direction of the electronic device, and a previously determined location of the electronic device.

11. The apparatus of claim 10, wherein the filtering scheme comprises Kalman filtering executed utilizing the estimated second location as corrected based on the first location.

12. The apparatus of claim 10, wherein the processor is configured to detect the first location based on GPS or detect the first location based on location information and signal intensity of an eNB.

13. The apparatus of claim 12, wherein the processor is configured to:
- if signal intensity of a serving cell is larger than a signal intensity threshold, detect the first location based on a weighted centroid estimation scheme; and
- if the signal intensity of the serving cell is smaller than the signal intensity threshold, detect the first location based on trilateration according to a number of effective eNBs.

14. The apparatus of claim 13, wherein the processor is configured to:
- detect the first location based on the weighted centroid estimation scheme when the number of effective eNBs is smaller than an effective eNB threshold; and
- calculate the first location based on the weighted centroid estimation scheme when a separation distance between cells is smaller than a separation distance threshold.

15. The apparatus of claim 12, wherein the movement velocity is determined by one of Doppler frequency, change of a location of the electronic device, or sensing information acquired by a sensor of the electronic device.

16. The apparatus of claim 12, wherein the processor is further configured to execute at least one of:
- acquiring the location information of the eNB from a server; and
- estimating the location information of the eNB utilizing trilateration based on the signal intensity of the eNB as detected for the electronic device in at least three separate locations.

17. The apparatus of claim 10, wherein the processor is further configured to:
- determine whether the difference between the detected first location and the estimated second location is below a target location measurement error level; and
- in response to determining that the difference between the detected first location and the estimated second location is not below the target location measurement error level, control a location measurement cycle.

18. The apparatus of claim 10, wherein a cycle on which the first location is updated is altered inverse proportion to the movement velocity.

* * * * *